US008626696B2

(12) United States Patent
Lambov

(10) Patent No.: US 8,626,696 B2
(45) Date of Patent: *Jan. 7, 2014

(54) METHOD AND SYSTEM FOR APPROXIMATE STRING MATCHING

(75) Inventor: Branimir Z. Lambov, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/334,442

(22) Filed: Dec. 22, 2011

(65) Prior Publication Data

US 2012/0095990 A1    Apr. 19, 2012

Related U.S. Application Data

(63) Continuation of application No. 12/098,604, filed on Apr. 7, 2008, now Pat. No. 8,140,462.

(30) Foreign Application Priority Data

May 1, 2007    (GB) .................................. 07107286.2

(51) Int. Cl.
*G06F 17/00* (2006.01)
*G06N 5/02* (2006.01)

(52) U.S. Cl.
USPC ........................................................... 706/48

(58) Field of Classification Search
None
See application file for complete search history.

(56) References Cited

U.S. PATENT DOCUMENTS

| 5,768,423 A * | 6/1998 | Aref et al. ...................... 382/228 |
| 6,401,060 B1 * | 6/2002 | Critchlow et al. ................. 704/1 |
| 2004/0122836 A1 * | 6/2004 | Bennett et al. ................. 707/100 |
| 2004/0193399 A1 * | 9/2004 | Potter et al. ........................ 704/4 |
| 2005/0086267 A1 * | 4/2005 | Avadhanam et al. ...... 707/104.1 |
| 2005/0091030 A1 | 4/2005 | Jessee et al. |
| 2006/0004744 A1 * | 1/2006 | Nevidomski (Alex Nevidomski) et al. .................................. 707/4 |

FOREIGN PATENT DOCUMENTS

WO    2006130947 A1    12/2006

OTHER PUBLICATIONS

Deorowicz et al., "Correcting Spelling Errors by Modelling Their Causes," Feb. 2005, pp. 275-285, Int. J. Appl. Math. Computer Science, vol. 15, No. 2.

(Continued)

*Primary Examiner* — Kakali Chaki
*Assistant Examiner* — Peter Coughlan
(74) *Attorney, Agent, or Firm* — Jeff Tang; Hoffman Warnick LLC

(57) ABSTRACT

A method and system for approximate string matching are provided for generating approximate matches whilst supporting compounding and correction rules. The method for approximate string matching of an input pattern to a trie data structure, includes traversing a trie data structure to find approximate partial and full character string matches of the input pattern. Traversing a node of the trie data structure to process a character of the string applies any applicable correction rules to the character, wherein each correction rule has an associated cost, adjusted after each character processed. The method includes accumulating costs as a string of characters is gathered, and restricting the traverse through the trie data structure according to the accumulated cost of a gathered string and potential costs of applicable correction rules.

21 Claims, 13 Drawing Sheets

(56) References Cited

OTHER PUBLICATIONS

Patent Cooperation Treaty (PCT), "Notification of Transmittal of the International Search Report and the Written Opinion of the international Searching Authority, or the Declaration" for Application No. PCT/EP2008/054013 dated Oct. 6, 2008, 10 pages.

Coughlan, Office Action Communication for U.S. Appl. No. 12/098,604 dated Feb. 24, 2011, 29 pages.
Coughlan, Office Action Communication for U.S. Appl. No. 12/098,604 dated Jun. 23, 2011, 31 pages.
Coughlan, Notice of Allowance and Fee(s) Due for U.S. Appl. No. 12/098,604 dated Nov. 14, 2011, 8 pages.

* cited by examiner

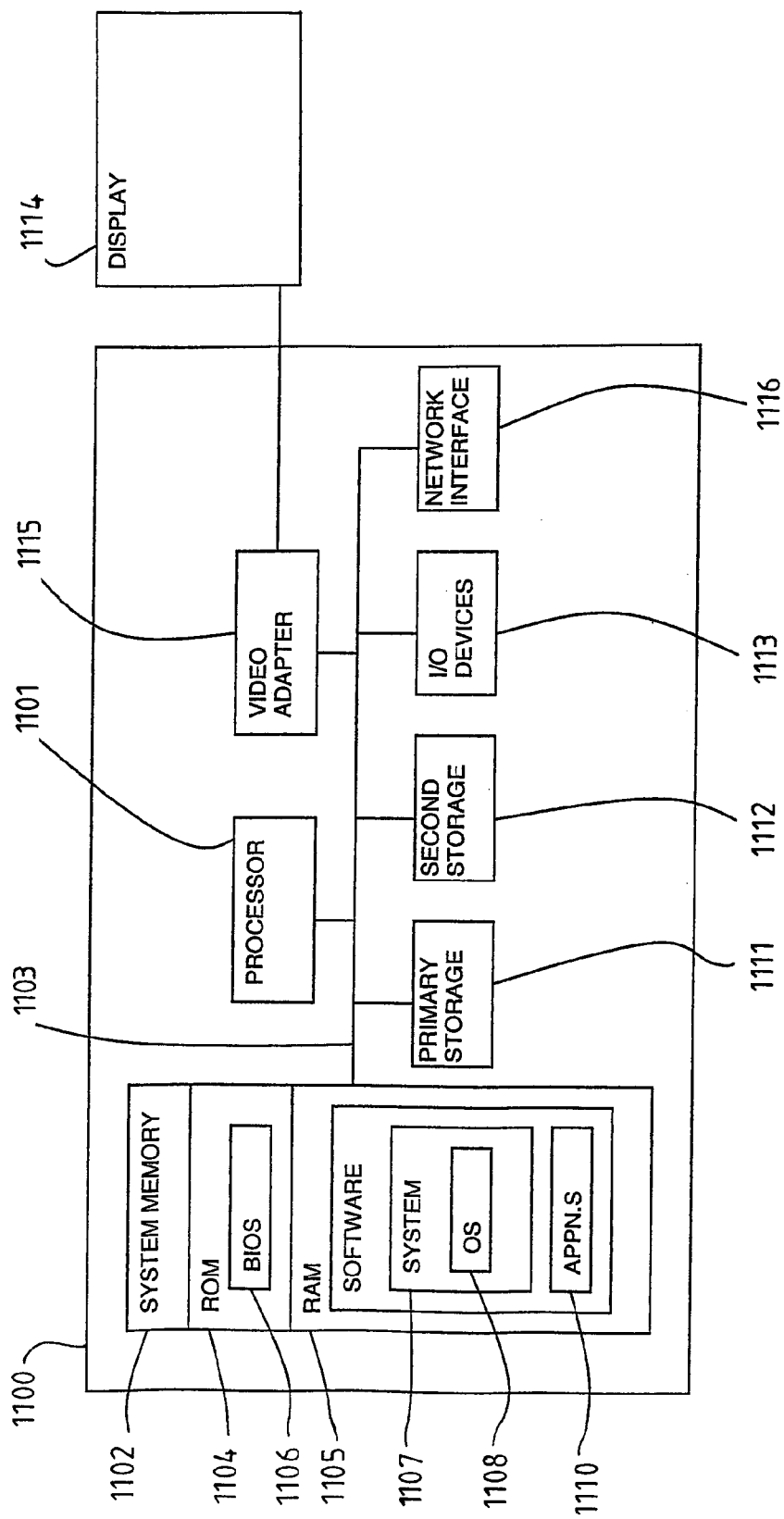

METHOD AND SYSTEM FOR APPROXIMATE STRING MATCHING

CROSS-REFERENCE TO RELATED APPLICATIONS

This application is a continuation of currently pending U.S. patent application Ser. No. 12/098,604 filed on Apr. 7, 2008. The application identified above is incorporated herein by reference in its entirety.

FIELD OF THE INVENTION

This invention relates to the field of approximate string matching. In particular, it relates to approximate string matching using a trie data structure.

BACKGROUND OF THE INVENTION

Approximate string matching is an operation often needed in scenarios such as the generation of spelling suggestions for misspelt words, approximate search in large databases in natural languages, or approximate search using other characters forming recognised patterns.

Approximate string matching with compound word handling is often needed where words or any sort of data which can be naturally broken up into components are matched. Breaks between words or components may be missing in an input pattern requiring compound word or component support to match the input pattern to recognised words or components.

US patent applications Nos. US 2005/091030 and US 2006/004744 describe methods of approximate string matching that can handle compound words. US 2005/091030 relies on a combination of large dictionaries of widely used compound words and semi-approximate search covering only certain types of errors.

US 2006/004744 includes a trie-based dictionary with gloss nodes for word fragments as well as for complete words. The method includes looping the trie walker back to the root node if it reaches the gloss node of a word fragment and the current gathered suggestion is shorter than the target string. This forces the trie walker to accept word fragments along with stand-alone words. US 2006/004744 gives a complete treatment of compound words, but its efficiency is not optimal due to repeated look-ups for right hand side word part matches.

In US 2006/004744 a method is also described in which approximate string matching in a trie-based dictionary includes correction rules in the trie data structure.

SUMMARY OF THE INVENTION

It is an aim of the present invention to provide an improvement to approximate string matching. The improvement aspects include the processing of correction rules, the provision of accumulated cost constraints on the matching process, and the processing of compound words.

According to a first aspect of the present invention there is provided a method for approximate string matching of an input pattern to a trie data structure, comprising: traversing a trie data structure to find approximate partial and full character string matches of the input pattern, wherein traversing a node of the trie data structure to process a character of the string applies any applicable correction rules to the character, wherein each correction rule has an associated cost, adjusted after each character processed; accumulating costs as a string of characters is gathered; and restricting the traverse through the trie data structure according to the accumulated cost of a gathered string and potential costs of applicable correction rules.

In one embodiment, recursive processing of branches of the trie is: fully performed if accumulated costs of a character string are below a predefined threshold; performed with restriction to characters that match characters at active positions in the input pattern, or are in applicable outstanding correction rules; or not performed if such characters are not present.

In addition to correction rules, the method may apply elementary transitions of characters including one of an insertion, a deletion, or a replacement, each associated with a cost.

Correction rules may be generated automatically for all possible applications of character transposition in the input pattern. Correction rules that are applicable to characters in an input pattern may be determined before starting the traverse.

Applicable correction rules may be indexed by the character position to be processed. Indexing by the character position to be processed may include allowing for a predefined number of inserted or deleted characters in the string.

The method may include determining candidate approximate matches and using the accumulated cost as a weighting for the candidate matches.

The method may also include determining approximate partial matches where a length of the partial match is less than a length of the input pattern, and saving the partial matches with the accumulated cost as a starting cost for a traverse for right hand matches to the input pattern. Traverses for right hand matches of compound words may be started at the character position of the end position of the partial match. The method may include iterating through all positions for which there is a partial match and using saved accumulated costs as starting points for right hand side match traverses. Any full right hand side matches may be combined with all left hand side partial matches. Left hand side partial matches may also be combined.

The accumulated costs for one or more partial matches may be used to compile a best case scenario for the right hand side look-up. Correction rules may be applied across points of attachments of word parts.

Vector processing may be used to perform the corrections simultaneously for a range of displacements.

According to a second aspect of the present invention there is provided a data structure for use in approximate string matching of an input pattern to a trie data structure, comprising: a data structure element for each applicable correction rule for a character of an input pattern, the element being indexed by a position of the character; a matrix of costs indexed by the character position, wherein the matrix of costs is updated during the traverse of the trie data structure to reflect accumulated costs of applied correction rules.

The character position may be determined by the number of characters processed together with the displacement of inserted or deleted characters. Multiple data structure elements may be provided for a character position for multiple applicable correction rules for the character. Multiple data structure elements are stacked corresponding to the number of characters in the output of a correction rule. The stacked data elements may be reversely linked.

The data structure may also include a matrix of saved costs for character positions of partial matches to the input pattern.

According to a third aspect of the present invention there is provided a system for approximate string matching of an input pattern to a trie data structure, comprising: a trie data structure having nodes representing characters in a string, the trie data structure storing allowed character strings; a plurality of character correction rules to be applied to the input pattern including a transition of one or more characters in the input pattern; and means for generating a correction rule structure for applicable correction rules for an input pattern, the correction rule structure having a plurality of rule elements indexed by a position of the character.

The system may include means for setting parameters for approximate string matching, including costs of correction rules. The system may also include means for storing accumulating costs for a gathered character string. The system may further include means for setting a maximum cost to restrict the traverse of the trie data structure. The system may include means for storing partial string matches with a saved accumulated cost.

The system may include vector processing means to perform correction on a range of displacements simultaneously.

Allowed character strings may be words and word parts, or recognised data components and partial data components.

According to a fourth aspect of the present invention there is provided a computer program product stored on a computer readable storage medium, comprising computer readable program code means for performing the steps of: traversing a trie data structure to find approximate partial and full character string matches of the input pattern, wherein traversing a node of the trie data structure to process a character of the string applies any applicable correction rules to the character, wherein each correction rule has an associated cost, adjusted after each character processed; accumulating costs as a string of characters is gathered; and restricting the traverse through the trie data structure according to the accumulated cost of a gathered string and potential costs of applicable correction rules.

The present invention complements US 2006/004744 with a fast method of approximate matching in the same environment. The method is based on Ukkonen's approximate matching algorithm, (Esko Ukkonen, "Algorithms for approximate string matching", Inf. Control, 64(1-3):100-118, 1985) applied to dictionary tries (see H. Shang and T. H. Merrettal, "Tries for approximate string matching", IEEE Transactions on Knowledge and Data Engineering, 8(4):540-547, 1996) generalized to handle varying operation costs, transitions, arbitrary correction rules, and word compounding.

A method of generating approximate matches using a dictionary of words and word parts that supports compounding and correction rules is provided. The method provides a significant performance boost, avoids the common problem of recursive recurrent look-ups for word parts, properly handles the most general set of features considered in the literature, and is suitable for implementation using vector processing units and the synergistic units of the Cell Broadband Engine.

BRIEF DESCRIPTION OF THE DRAWINGS

Embodiments of the present invention will now be described, by way of examples only, with reference to the accompanying drawings.

FIG. 11 is a block diagram of a computer system in which the present invention may be implemented.

DETAILED DESCRIPTION OF THE INVENTION

Many applications include executable code for carrying out approximate string matching against given resources. For example, a spell checking application carries out approximate string matching of words in a document executed in an application against a resource in the form of a dictionary of words in a chosen language and suggests alternatives to an unrecognized word. As another example, a search engine may include a word recognition application which compares an input word with words in a dictionary and suggests other words which may have been intended for the search input. Approximate string matching is not limited to word analysis and can extend to database retrieval of recognized references and other applications.

Figure 1:
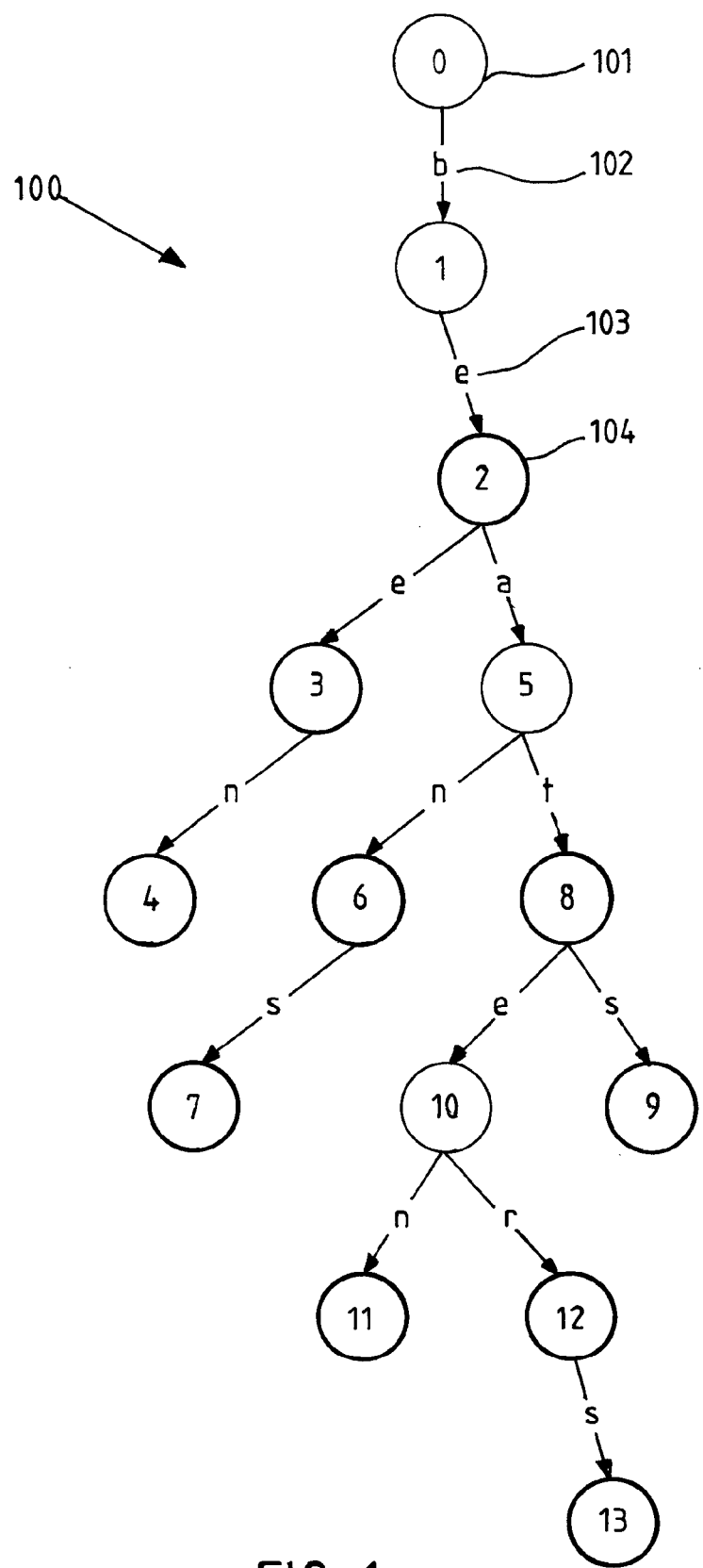
FIG. 1 is an example of a trie data structure as known in the prior art.

One technique for approximate string matching uses a resource in the form of a trie-based dictionary. Referring to FIG. 1, a trie data structure 100 is shown. The trie data structure 100 is a multi-way tree structure with a root node 101 from which child nodes extend. In turn, each child node can become a parent node with child nodes of its own. The transitions 102, 103 in the trie data structure represent characters (for example, in an alphabet) and a string of characters is represented by following a route down the trie from the root node 101 to a leaf node. A node reached after a recognized string of character is marked as a final node 104, shown in the figure by bold node outline.

A trie data structure can be used to store a large dictionary of recognized string components and parts of the string components. In the most obvious case, the trie data structure stores words and parts of words. The alphabet can be defined for the given application, for example, {0,1} for binary files, {the 256 ASCII characters}, {a,b,c . . . x,y,z}, or another form of alphabet such as Unicode, which represents symbols of most world languages. The following description refers to words and word parts and to text, but it should be understood to apply equally to any recognized character string or string parts and to characters other than text characters.

The concept of a trie data structure is that all strings with a common prefix propagate from a common node. When the strings are words in the alphabet {a,b,c . . . x,y,z}, a node usually has at most 26 child nodes—one for each letter. The alphabet may also include punctuation characters such as an apostrophe or a hyphen in which case a node may have more child nodes. The string can be followed from the root to the leaf that ends a string. A trie-based dictionary has the advantage that the data is compressed due to the common entries for prefixes. A method of scanning a trie-based dictionary in order to recover approximate matches is called a trie walker.

In the example shown in FIG. 1, a trie data structure 100 is shown with a root node 101. The root node 101 will have a maximum number of child nodes for the characters in the alphabet plus a terminator. One path is illustrated in the trie 100 from the child node for the letter "b" 102. The string "be" is a recognized word and therefore the node 104 is marked as final. Similarly, the following recognized words are shown in the trie 100: "bee", "been", "bean", "beans", "beat", "beats", "beaten", "beater", "beaters". Where each valid word ends in the trie 100, the relevant node is marked as final. The final node may contain extra information about the valid dictionary entry formed by the root-to-node path string, such as flags denoting whether the string is a whole word or a word part that can be combined with other word parts to form a compound.

A trie data structure represents a dictionary of words or recognized sequences of characters to which the approximate string matching technique compares a target string of characters which is the subject of the approximate matching. The target string is compared, one character at a time, to the transitions of a trie starting from the root node.

In the following, the word displacement refers to a positive or negative integer which is added to the current character position to form the target position in a target string.

A traverse refers to a recursive process of constructing a string for every root-to-node path in the trie from an empty string. The described method starts with an array of costs associated with a range of displacements. The traverse adds characters to a gathered string as it progresses through the trie. Every transition through the trie adds a character to a gathered string and is reflected in all accumulated costs. A match between the new transition and a target character is reflected by simply copying the previous cost. A mismatch is handled by applying an edit operation such as an insertion or a deletion. The process always progresses one character forward in the target string, extended with imaginary non-matching characters on either side, with the displacements forming a window of current target characters.

Basic edit operations which may be carried out as approximations in a traverse are as follows:

Accept a non-matching character in a gathered string and adjust the cost by adding a predefined value to the previous cost at the same displacement. This results in a substitution of a character in the gathered string compared to the target string.

Accept a non matching character in a gathered string and adjust the cost by adding a predefined value to the previous cost at the next displacement. This results in an insertion of a character in the gathered string compared to the target string.

Move forward in the target string by adjusting the cost through adding a predefined value to the current cost at the previous displacement. This results in a deletion of a missing character in the gathered string compared to the target string.

For every displacement, all of the methods above are attempted, and only the lowest resulting cost is retained. When a final node is reached and the current target position for one of the displacements reaches the end of the target string, the gathered string defines a suggestion, its cost given by the cost accumulated at this displacement.

Prior art methods include an edit distance or error value which counts the number of modifications made and an error tolerance defines how broad the search should be. In the described method this is replaced by separate cost values associated with each of the basic edit operations, and a cost maximum that defines which suggestions are accepted.

In US 2006/004744 a method is described in which approximate string matching in a trie-based dictionary includes correction rules in the trie data structure. The contents of US 2006/004744 is incorporated herein by reference.

The technique of using correction rules in a traverse is also used in the described method. A correction rule refers to a pair of character sequences that describe a possible substitution within the target string. For example, substitution of sequence "ph" to "f" is a correction rule reflecting a common phonetic misspelling for natural languages. A sequence-to-sequence character substitution is carried out according to the matched correction rule.

The described method provides a technique of processing correction rules that uses processing of all applicable rules during trie traversal. The correction rule technique allows the method to:

reflect valid applications of correction rules to accumulated costs;

ignore irrelevant branches of the trie; and restrict look-ups through relevant branches of the trie when available costs do not permit the introduction of arbitrary characters.

The technique relies on pre-processing and its performance is independent of the mode of storage of the correction rules, and also permits flexibility in the actual format of the rules at a low performance cost.

The described method also provides a technique of approximately matching compounds, which relies on compiling "best case" information from partial matches. The technique performs a single trie look-up for every relevant position of the pattern and permits the application of correction rules and transitions across the points of attachment of word parts.

Figure 2:
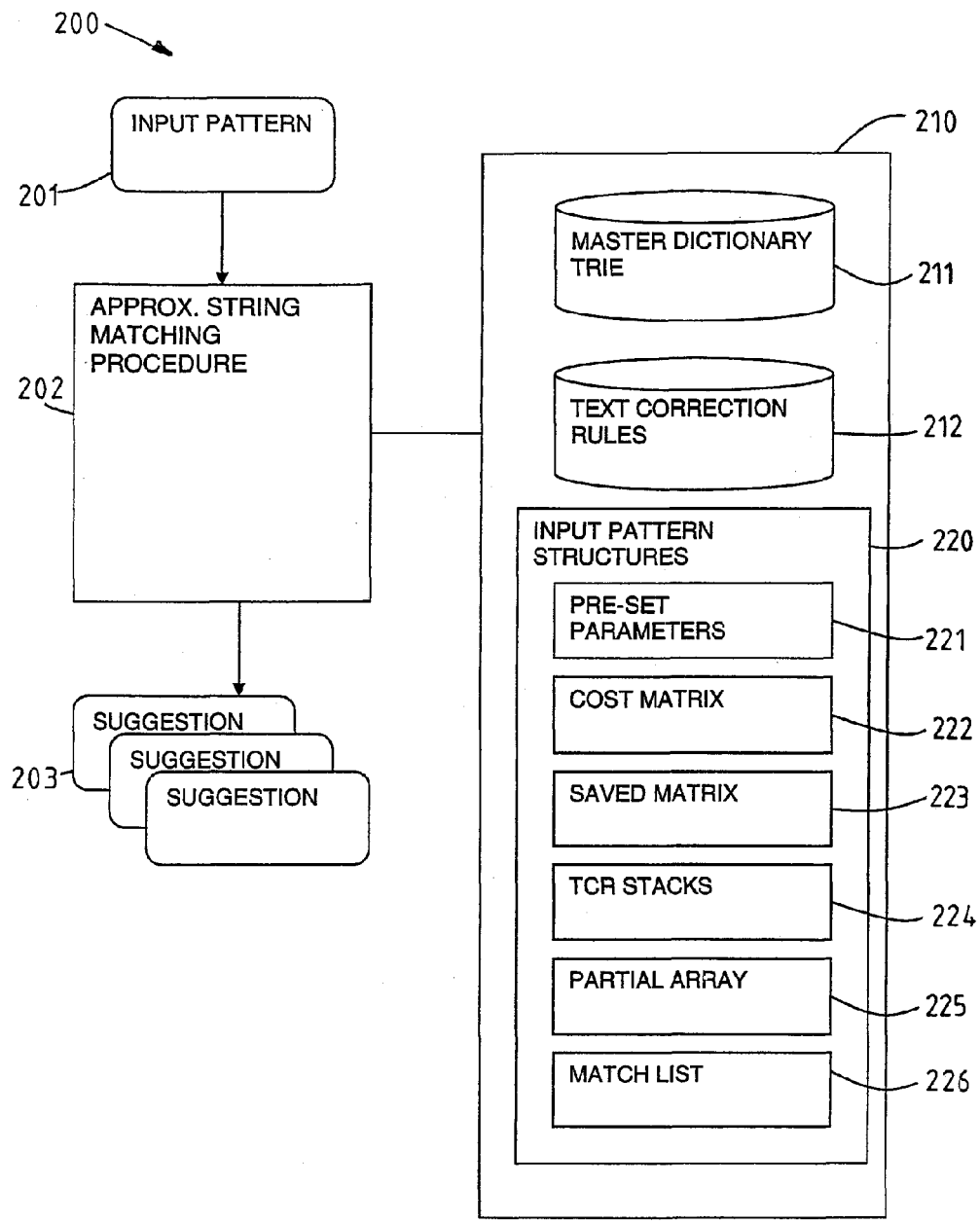
FIG. 2 is a block diagram of a system in accordance with the present invention.

Referring to FIG. 2, a block diagram is shown of an example embodiment of the described system 200. An input pattern 201 in the form of a string of characters is provided to an approximate string matching procedure 202. The procedure 202 outputs a suggestions list 203 of possible matches. Each suggestion 203 can be a stand-alone word, a compound word, or a multi-word expression.

The procedure 202 uses associated stored components 210. The components 210 include a specified trie 211 which is traversed by the procedure. The trie stores a dictionary of words and word parts that will be used by the algorithm. A set of text correction rules (TCR) 212 are defined which are applied by the procedure 202 during traverse of the trie 211.

The stored components 210 also include structures 220 for an input pattern 201. The structures 220 include preset parameters 221, a cost matrix 222, a saved cost minima matrix 223, text correction rule elements 224, an array 225 of partial matches indexed by the end position of the partial match, and a match list 226 for matches.

In the described example embodiment, given a pattern to be approximately matched, a dictionary trie dict of words and word parts, and a dictionary or list rules of text correction rules, the described method produces a list of all approximate matches within a preset maximum cost max_cost and maximum displacements max_ins and max_del. The costs cost_sub, cost_ins, cost_del, cost_tra of the four basic transitions (substitution, insertion, deletion and transposition) are implicit parameters of the method.

Each correction rule is given by a pair of from and to strings, and a cost associated with the transition (a rule is written in the form "fromto(cost)").

A costing system is used to value the distance of a suggestion from the input pattern. A cost may be associated with each one of the basic transitions as well as with each correction rule. The cost is added for the transition made. For example, if there is a cost 50 for substitution and a cost 20 for insertion, the suggestion "these" from "thez" will have a cost of 70 as it includes a substitution of "z" with "s" and an insertion of an "e".

In the following description, the variables pos and j refer respectively to position (number of characters processed, ranging from 0 to length(pattern)+max_ins) and displacement (ranging from −max_ins to +max_del). The displacement is the difference between the input position and the output position, which is used to match incoming characters to the characters in the pattern. The displacement indicates where characters should continue to be matched after a transition has been applied. For example, the string "done" is a match for the pattern "doone" with displacement 0 for the first two characters, includes a deletion, and then matches the rest with displacement 1. This means that, after the deletion, the fourth character of the pattern "done", namely the "n", is matched to the third character of the string "done", and so on.

The storage used in the method comprises two matrices cost and saved. The cost matrix stores accumulated costs for each pos and j. The saved matrix stores saved partial match cost minima (initially infinity) for each pos and j which is used when decompounding words or word parts. Sets of TCR elements are also stored all indexed by pos and j.

Figure 3A:
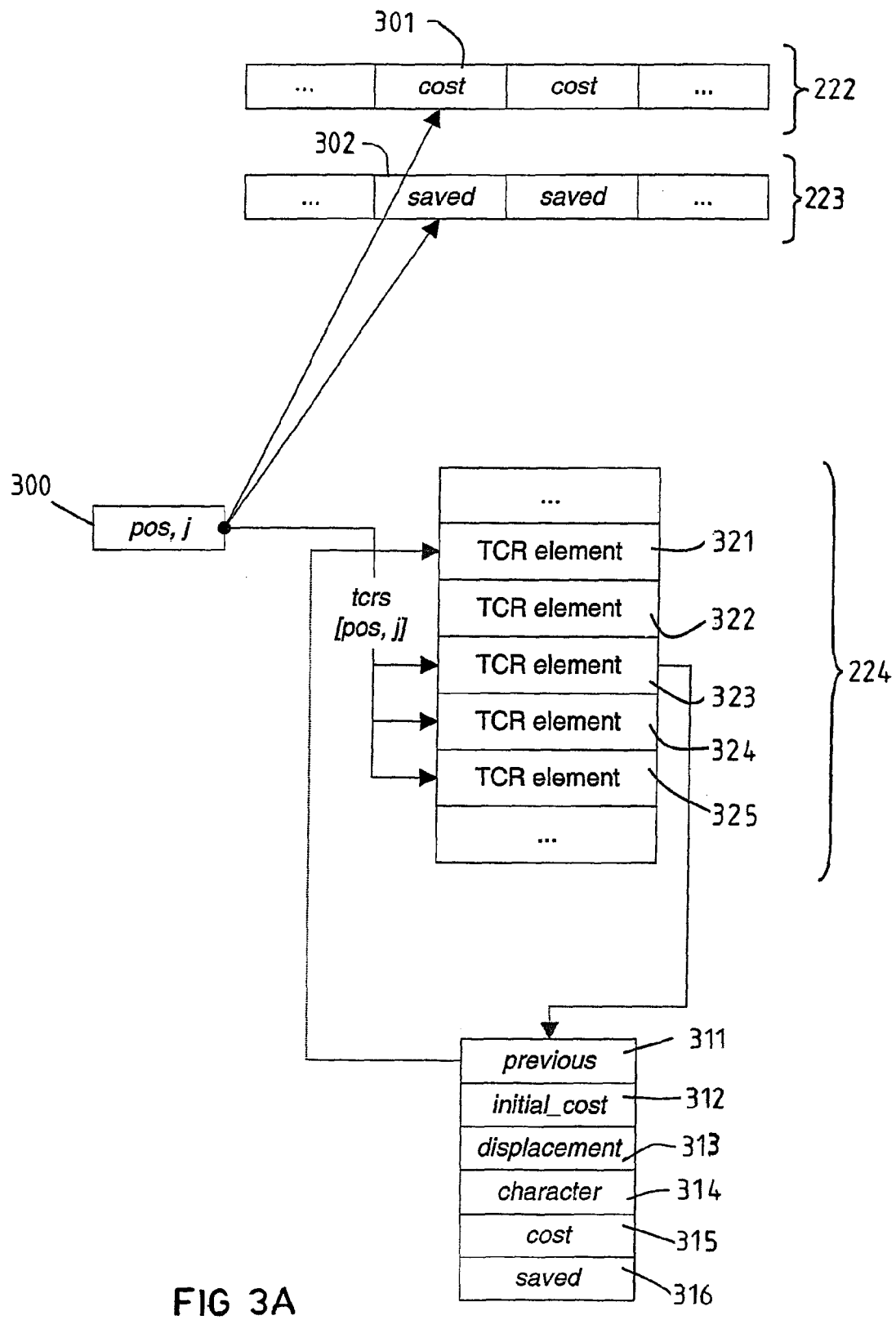
FIGS. 3A and 3B are schematic representations of data structures in accordance with the present invention.

An initial step of the method isolates the correction rules that apply to the pattern to be approximately matched, and converts them to TCR element stacks, reversely linked lists of TCR elements with the structure shown in FIG. 3A. The TCR element stacks have a length determined by the number of characters in the rule output. The TCR elements in a stack have the same displacement, which indicates the character position once the rule has been applied.

FIG. 3A shows a cost matrix 222 and a saved matrix 223 each with fields 301, 302 indexed by a position and displacement (pos, j) pair 300.

Each TCR element 224 is also associated with a (pos, j) pair 300. Multiple TCR elements 224 are provided for each (pos, j) pair where multiple rules are applicable. For example, in FIG. 3A, TCR elements 323-325 relate to the same (pos, j) pair for different rules 1, 2, 3. A number of rules may be applicable to a (pos, j) pair. When a trie is traversed and a character is met, only one of the rules is actually applied. If multiple rules can be applied for the same string (for example, "bp" and "abep"), the resulting cost is calculated and the rule with the smaller cost is used.

TCR element 321 is in a stack with TCR element 323 as they relate to the same rule (rule 1) for (pos, j) and (pos−1, j).

In the described embodiment, each TCR element 224 has the following fields 311-316:

a previous field 311 indicating if the TCR element 224 is either an initial element or is a non-initial element which links to the previous element;

an initial_cost field 312;

a displacement field 313 (this field is not relevant for non-initial elements);

a character field 314;

a cost field 315; and a saved field 316.

A TCR element 224 is either an initial element or is a non-initial element which links to a previous element. An element is initial if it is the first character of the rule. Initial elements have their initial_cost value set to non-zero and have a displacement defined. Non-initial elements have a zero initial_cost and have a previous link defined. These parameters define the place from which the cost is taken with which the processing of this element is started. This is either the previous cost in the TCR stack (i.e. the value after processing all previous characters in the rule), or the accumulated cost at (pos, displacement) adjusted by initial_cost.

The initial TCR elements are initialized by setting initial_cost field 312 to the sum of the rule's cost and a cost applied at each step in a traverse step_cost (some number significantly bigger than max_cost) multiplied by the length of the rule's to string. A non-initial element has its initial_cost field 312 as 0 and its previous field 311 has a link pointing to the previous element in the stack, the latter associated with (pos−1, j).

The displacement field 313 is computed as j plus the difference between the lengths of the to and from strings. For all elements in the stack, the character field 314 is set to the respective character in the to string, the cost field 315 is left undefined, and the saved cost field 316 is initialized to infinity.

Figure 3B:
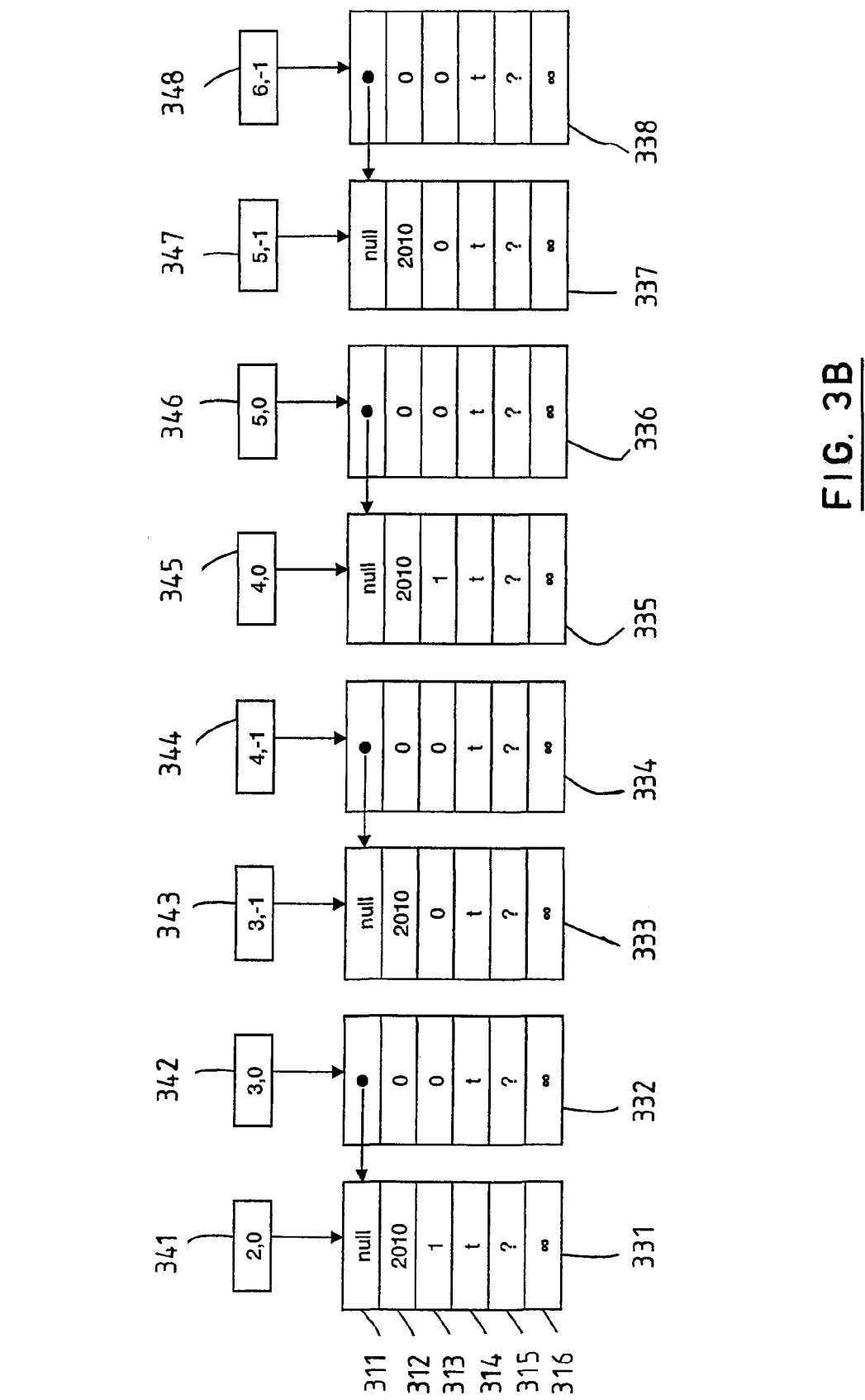

FIG. 3B shows a worked example of TCR elements 331-338 indexed by (pos, j) pairs 341-348. In the worked example, the input pattern is "patetrn", and the pre-processing procedure has to map the rule "ttt (10)" to the TCR elements 331-338.

Let step_be 1000 and max_ins=max_del=1.

The elements are only there when a match between the rule and the pattern is made at the place defined by the (pos, j) pair. The rule "t->tt" is only applicable at the positions after a "t" in the pattern, i.e. 3 and 5.

Taking into consideration the possible displacements (−1 to 1), the list of applicable places becomes (4, −1), (3, 0), (2, 1), (6, −1), (5, 0), (4, 1). In (2, 1) and (4, 1) the displacement before applying the rule (the value in the rule's initial element's displacement field) is 2, which is outside the permitted range, thus these two are deleted. Additionally, the rule output is two characters long, that is why the TCR stacks are of length 2 (shown by the connecting arrows from the "previous" field), ending at the four places remaining This results in the eight TCR elements 331-338 shown in FIG. 3B, which are four TCR element stacks each of two elements.

TCR elements (3, −1) 333 and (4, −1) 334 are the two elements of one stack referring to the application of the rule to the third character of the pattern, where the displacement after the application of the rule is −1.

Matching "pattern" with "patetrn" will apply this rule to match "pa" with "pa" at displacement 0, "tt" with "t" by the TC rule, "e" with "e" at displacement −1, " " with "t" as a deletion, and "rn" with "rn" at displacement 0.

In this example, TCR element 333 is for character position 3 with displacement −1 and has the following fields:

It is an initial element and therefore the previous field 311 is set to "null".

The initial_cost field 312 is the rule's cost (10) plus the product of the step_cost (1000) and the length of the rule's to string (2) (which gives, 10+(1000*2)=2010).

The displacement field 313 is j plus the difference between the lengths of the to and from strings (which gives, −1+1=0).

The character field 314 is the rule's first character in the to string (t).

The cost field 315 is left undefined (?).

The saved field 316 is initialized as infinity.

The next TCR element 334 is for character position 4 with displacement −1 and has the following fields:

It is a non-initial element and therefore the previous field 311 links to TCR element 333 for (pos−1, j), namely (4−1, −1).

The initial_cost field 312 is set to 0 as this element in not initial.

The displacement field 313 is arbitrarily chosen as displacement is not relevant for non-initial elements.

The character field 314 is the rule's second character in the to string (t).

The cost field 315 is left undefined (?).

The saved field 316 is initialized as infinity.

The structures shown in FIGS. 3A and 3B provide a mechanism by which rules can be applied to multiple character positions with an allocated cost. In use, during a traverse of a trie, the rules are applied and the cost and cost minima are saved to the matrices 222, 223 and to the TCR elements 224 for relevant positions.

The purpose of the TCR stacks is to filter out all irrelevant rules, and to make it very easy to translate the applicable rules to costs when the actual characters from the trie are gathered. In case of a mismatched rule, the process simply computes an infinite cost. The TCRs are stored in stacks, because this format directly matches trie traversal: every time the procedure steps through a transition in the trie the TCR stack records the relevant information for the new node, and that information is readily available for all children to that node.

The cost of the correction rules is given by the user, it is not evaluated by the cost it takes to transform things inside the correction rule. For example, there can be a transition rule "ck(10)", and, simultaneously, a cost 45 for substitution.

Here, the cost 10 is a parameter to the method and not computed as 45, although it takes a substitution to convert c to k. Both the rule and substitution apply to "disc". What the method will use is the operation with lower cost, which in this case will be the correction rule.

The basic edit operations insertion, deletion, substitution and transposition can also be viewed as correction rules, ones that are always available. One of the differences between this method and previous ones is the omission of transposition as a basic operation in the process itself, because it is translated to correction rules.

The pre-processing procedure converts the transpositions possible in the pattern into correction rules (e.g. it generates rules "peep (cost_tra)" and "ette (cost_tra)" for the pattern "pet") and then translates all applicable correction rules into TCR stacks. Various methods of implementing this procedure may be used, with various storage formats for the rules, and various levels of flexibility in the rules specification (such as, for example, a way to specify that "aaa(10)" should be a rule for any a).

The traverse procedure finds full and partial left hand side matches for the pattern. The partial matches are stored in lists partial, and also reflected as minimum costs in the saved matrix and the saved field of TCR elements. The procedure then iterates through all positions for which there is a partial match, and uses the saved costs as starting points for right hand side match look-ups. The partial matches found are added to the respective lists. The full matches are then combined with all left hand side word parts in the current list, recursively adding other left hand side parts if needed.

The minima saved in both the TCR elements' saved field and the saved matrix form best-case scenarios for the subsequent right hand side look-up. If a rule can be applied starting from one of the partial left hand side matches, the best cost with which it can be applied is used for the look-up. If a right hand side word part matches the rest of the characters in the rule, the saved cost will be applied. Paired with the saved accumulated cost minima, this ensures that whenever l+r has a certain cost in relation to the pattern, the cost with which r will be found in the secondary look-up will be at most as high.

Hence, all right hand side matches, which could yield a low enough cost in combination with some left hand side part, will be found.

Figure 4:
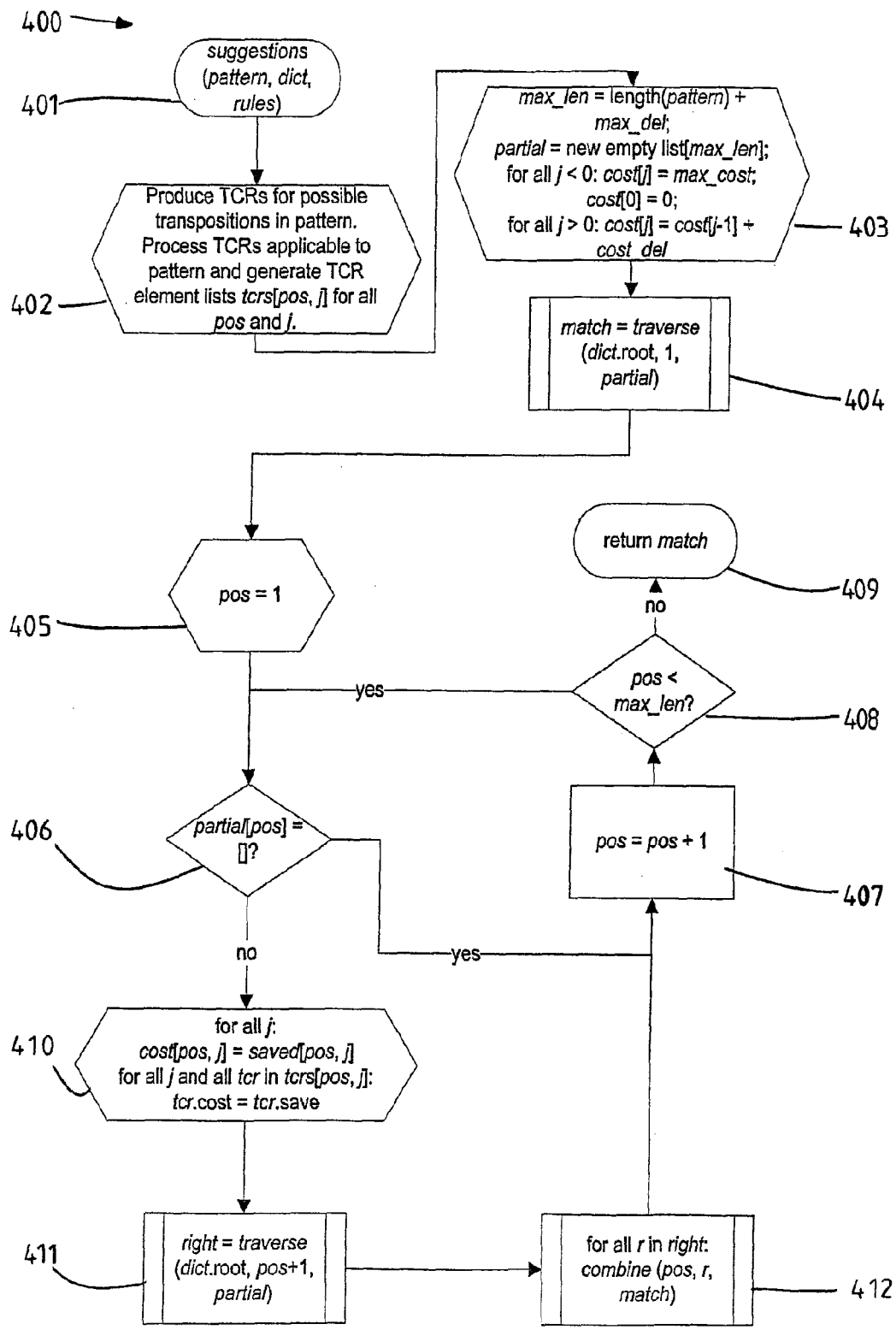
FIG. 4 is a flow diagram of an overall method in accordance with the present invention.

Referring to FIG. 4, a flow diagram 400 shows the main method of the described example embodiment. The method is for determining suggestions 401 for an input pattern with a defined dictionary and defined rules, suggestions(pattern, dict, rules).

In a pre-processing step 402, TCRs are produced for possible transitions in the input pattern and the TCRs applicable to the input pattern are processed to generate TCR element lists tcrs[pos, j] for all pos and j, as shown in FIGS. 3A and 3B.

Parameters are set 403 as:
max_len=length(pattern)+max_del;
partial=new empty list[max_len];
for all j<0: cost[j]=max_cost;
cost[0]=0
for all j>0: cost[j]=cost[j−1]+cost_del A sub-routine 404 is then carried out to traverse through the trie to find partial or full matches to the left hand side of the input pattern, match=traverse (dict.root, 1, partial). This sub-routine 404 is described below with reference to FIG. 6.

Starting at pos=1 405, it is determined 406 if there is no partial match at the current position, partial[pos]=[ ]. If so, the method skips all processing for this position to 407.

Otherwise, the method looks for right hand side matches to be combined with the partial left hand side matches already found. The partial matches are stored in lists partial and the saved costs are used 410 to form the initial state for the right-hand side lookup:
for all j:
cost[pos, j]=saved[pos, j]; and
for all j and all tcr in tcrs[pos, j]:
tcr.cost=tcr.save.

A sub-routine 411 is carried out to find matches for the right hand side of the input pattern starting from the position of the partial left hand side match, right=traverse(dict.root, pos+1, partial). Again, this sub-routine is described below with reference to FIG. 6.

A sub-routine 412 is carried out to combine the right hand side matches with the left hand side matches, for all r in right: combine(pos, r, match). This combining sub-routine 412 is shown in detail in FIG. 5.

After the sub-routine 412, the loop iterates to pos=pos+1, 407 and the loop repeats for the next position of a partial left hand side match until the pos is the max_len 408 and all gathered matches in the list match are returned 409.

Figure 5:
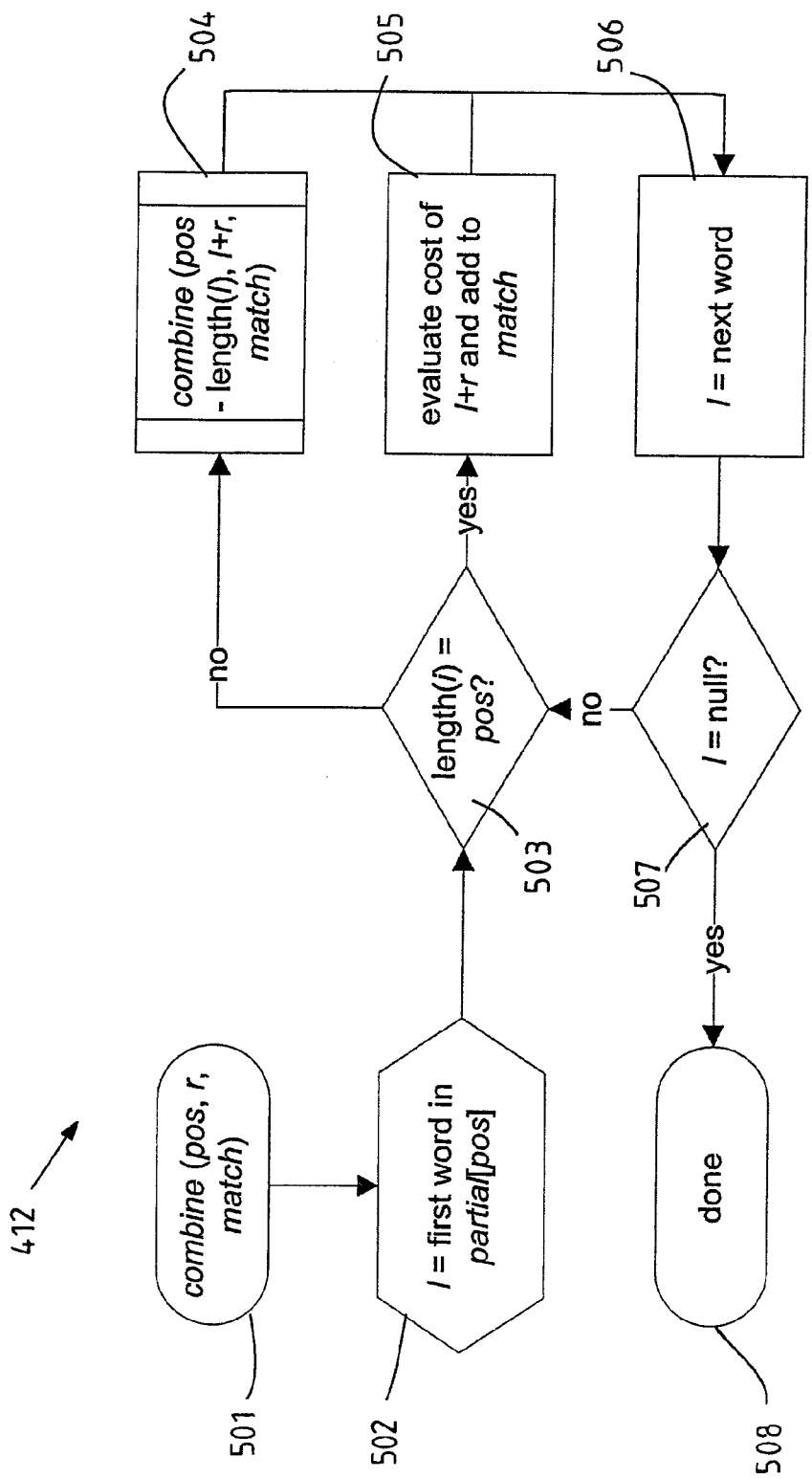
FIG. 5 is a flow diagram of a method of combining compound words in accordance with an aspect of the present invention.

Referring to FIG. 5, the combination of word parts is done recursively, so that several word parts can be combined. For example, for an input pattern "doens'tdo" the method finds partial matches "does" in partial[4], "n't" in partial[8] and full match "do" from position 8. The combination procedure should be able to compose this into "doesn't do". As an alternative, multiple word parts may be combined using the generation and traversal of a secondary trie.

FIG. 5 shows the sub-routine 412 of FIG. 4 for combining right hand side matches with left hand side partial matches, combine(pos, r, match) 501. A first word l extracted from the partial list partial[pos] 502. It is determined 503 if the length of l equals pos. If not, the procedure is called recursively 504 to combine shorter left hand side matches with the concatenation of word parts l and r, combine(pos−length(l), l+r, match).

If it is determined 503 that the length(l)=pos, the cost of l+r is evaluated 505 and the combination is added to the match list.

The method then loops to the next word 506, l=next word. It is determined if there is a next word 507, l=null. If there is a next word, the method loops to determine 503 if the length of the new word length(l)=pos. If there is no next word, the process ends 508.

Figure 6:
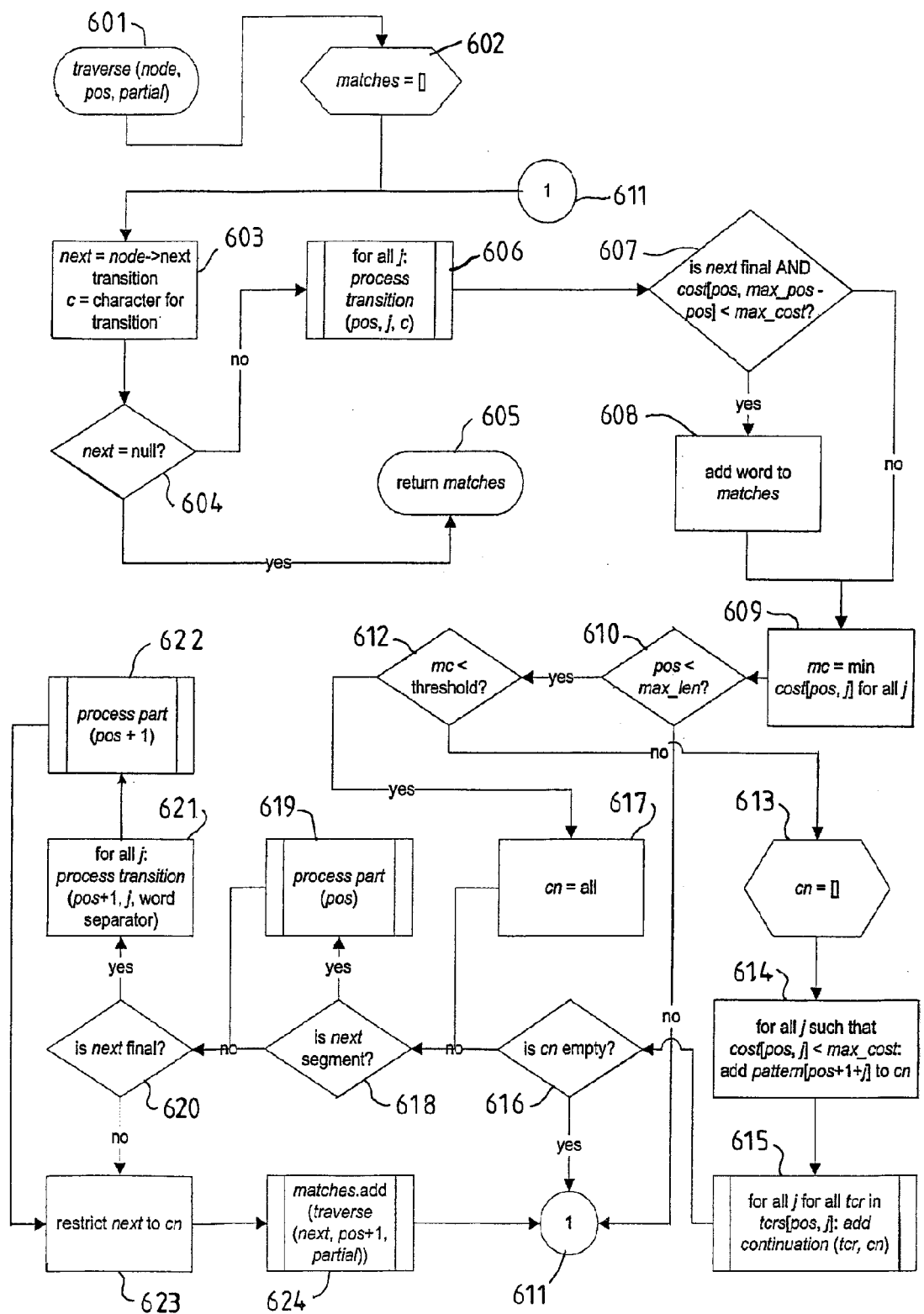
FIG. 6 is a flow diagram of a method of traversing a trie in accordance with an aspect of the present invention.

Referring to FIG. 6, the procedure for trie traversal is shown. It traverses the node recursively; simple edit operations as well as correction rules are applied after each new character is processed.

The recursive processing of new branches is:

restricted to only the characters that either match characters at active positions in the pattern or are in applicable outstanding correction rules;

dropped altogether if such characters are not present; or fully performed if the accumulated costs are still below the threshold (defined as max_cost−min(cost_sub, cost_ins)).

In detail, referring to FIG. 6, a traverse 601 traverse(node, pos, partial) is carried out. Matches are defined 602 as matches=[ ]. Next is defined 603 as next=nodenext transition, with c=character for transition. It is determined 604 if next=null; if so, the matches are returned 605 and the procedure ends. If next≠null, a sub-process 606 is carried out to process a new character, for all j: process transition (pos, j, c). This sub-process 606 is described below with reference to FIGS. 7A and 7B.

It is then determined 607 if next is final AND cost[pos, max_pos-pos]<max_cost. In other words, if the next node is a final node and the cost is less than the defined maximum allowed cost. If so, the word is added 608 to the matches list.

The minimum cost is determined 609, me=min cost[pos, j] for all j. It is then determined 610 if the position is less than the max_len. If not, the procedure loops via symbol "1" 611 to process the next transition 603. Otherwise, it is determined 612 if the minimum cost is less than a predefined threshold, mc<threshold.

If the minimum cost is not less than the threshold max_cost−min(cost_sub, cost_ins)), a list variable constrain (cn) is defined 613 to restrict the characters to be processed in the next node. Pattern[pos+1+j] is added 614 to cn for all j such that cost[pos, j]<max_cost. A sub-routine 615 is carried out for all displacements in the TCR elements to add the relevant characters to the constrain set, for all j for all tcr in tcrs[pos, j]: add continuation (ter, cn). This sub-routine 615 is described with reference to FIG. 8 below. It is then determined if cn is empty 616, and if so, the procedure loops via symbol "1" 611 to process the next transition 603.

If it is determined 612 that the minimum cost is less than the threshold, the constrain set is set to all the characters 617.

If cn is not empty 616, the procedure then determines 618 if next is a word segment. If so, a sub-routine 619 is carried out to reflect the accumulated weight in the saved costs and TRC cost minima, process part(pos). This sub-routine is described below with reference to FIG. 9.

It is then determined 620 if next is final. If so, a word separator is added 621, for all j: process transition (pos+1, j, word separator). A sub-routine 622 is then carried out to reflect the accumulated weight as a saved cost and TRC cost minima for the next position, process part (pos+1). This is the same sub-routine as 619 and described below with reference to FIG. 9.

The next node is then restricted to the characters in the constrain set 623, the sub-routine 624 continues the node traverse from the next node, and the results are added to the list of matches, matches.add (traverse(next, pos+1, partial)). The procedure then loops from symbol "1" 611 to process the next transition 603.

Figure 7A:
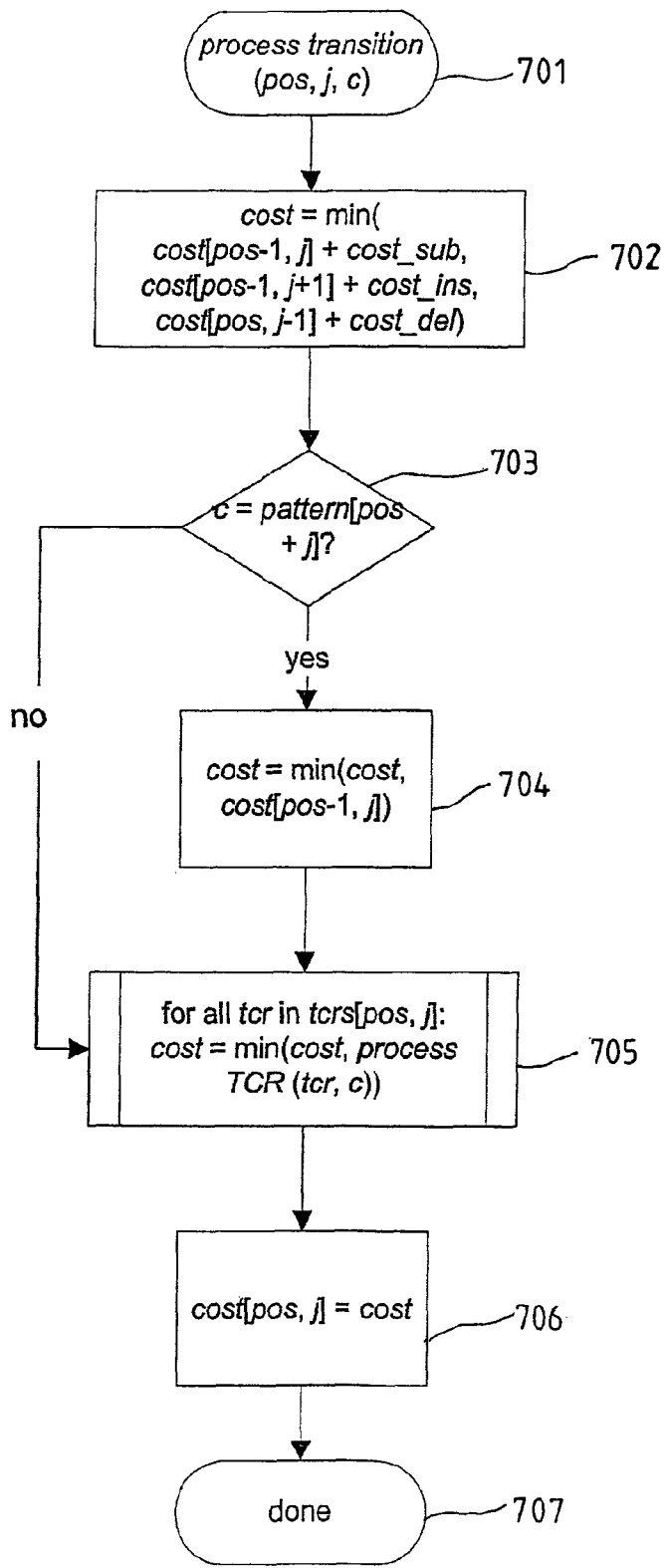
FIGS. 7A and 7B are flow diagrams of methods of processing a new character in a trie traverse in accordance with an aspect of the present invention.
Figure 7B:
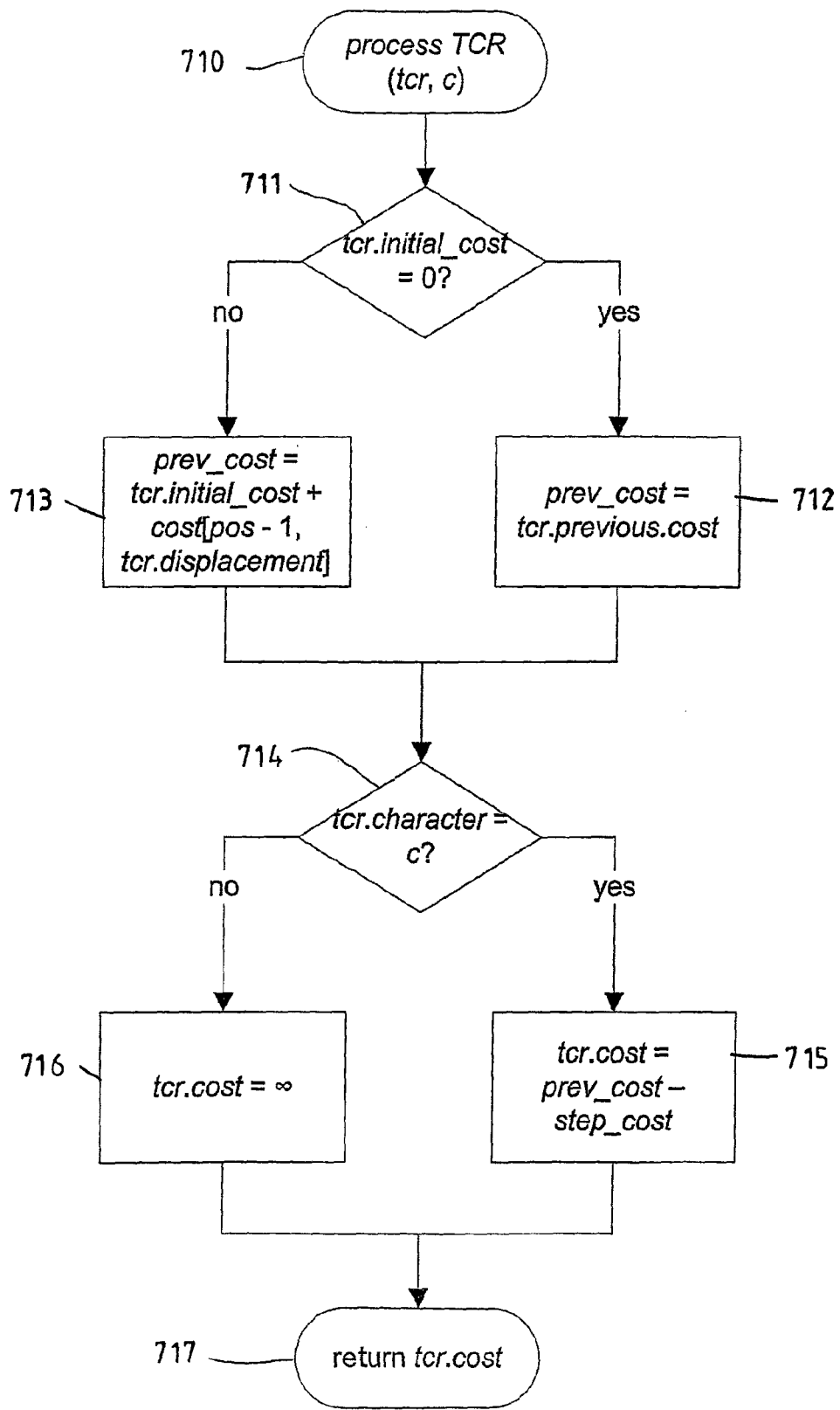

Referring now to FIGS. 7A and 7B, the sub-routine 606 of processing transitions is described. Processing a new character is done by applying the basic operations to compute new costs for all displacements, and computing new TCR element costs from the TCR stack's previous element's cost or, if the element is initial, one of the accumulated costs in the previous position. A mismatch of the expected character and the processed one sets the cost to infinity which ensures that this TCR stack will not yield a cost that may be used by the minimum operation in process transition.

In detail, process transition (pos, j, c) is carried out 701. The cost is defined 702 as the minimum of the costs of: the cost of the previous position with displacement j plus the cost of substitution; the cost of the previous position with displacement j+1 plus the cost of insertion; and the cost of the current position with displacement j−1 plus the cost of deletion. Which is cost=min(cost[pos−1, j]+cost_sub, cost[pos−1, j+1]+cost_ins, cost[pos, j−1]+cost_del).

It is determined 703 if the character for transition matches the pattern at (pos, j), c=pattern[pos+j]. If so, the cost is set 704 as the minimum of the cost and the cost at the previous position, cost=min(cost, cost[pos−1, j]).

A sub-routine 705 is then carried out for all the TCR elements to apply the TCR costs, for all tcr in tcrs[pos, j]: cost=min(cost, process TCR (tcr,c)). This sub-routine 705 is described in FIG. 7B. The cost is then set in the cost matrix, cost[pos, j]=cost and the process ends 707.

FIG. 7B, shows the sub-routine 705 of process TCR (tcr, c) 710. It is determined 711 if the TCR element's initial_cost is zero, tcr.initial_cost=0. If so, the previous cost is set to the previous TCR element's cost 712, prev_cost=tcr.previous.cost. If not, the previous cost is set to the TCR element's initial_cost plus the cost of the previous position 713, prev_cost=tcr.initial_cost+cost[pos−1, tcr.displacement].

It is then determined 714, if the TCR element's character matches the character for transition, tcr.character=c. If so, the TCR element's cost is set to the previous cost minus the step cost 715, tcr.cost=prev_cost−step_cost. If not, the TCR element's cost is set to infinity 716, tcr.cost=infinity. The TCR element's cost is returned 717.

Figure 8:
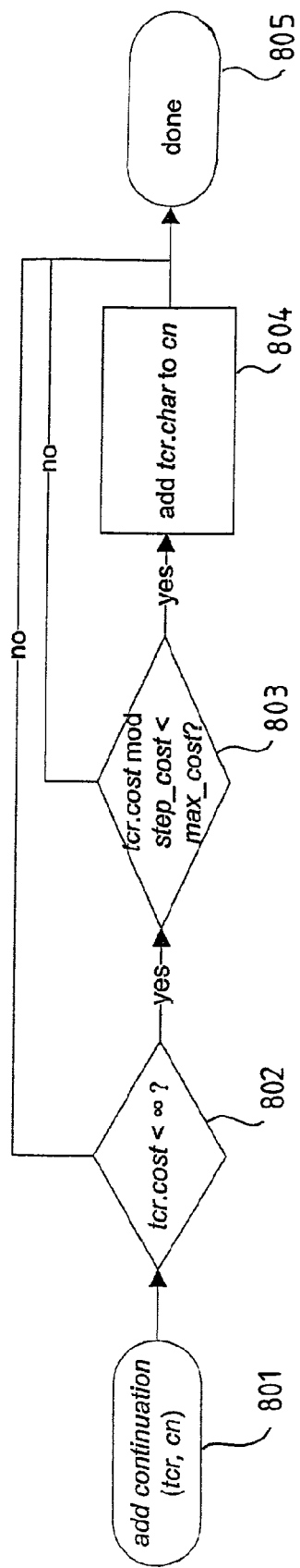
FIG. 8 is a flow diagram of a method of finding if a correction rule is applicable in accordance with an aspect of the present invention.

Referring to FIG. 8, the sub-routine for finding if a TCR is still applicable is described as used at box 615 of FIG. 6. Add continuation for a TCR element is defined 801. It is determined 802 if the TCR element's cost is less than infinity, tcr.cost<infinity. If so, it is determined 803 if the TCR cost modulus of the step cost is less than the maximum cost, tcr.cost mod step_cost<max_cost. If so, the TCR element's character is added to the set of constrain characters cn 804. The sub-routine then ends 805.

Figure 9:
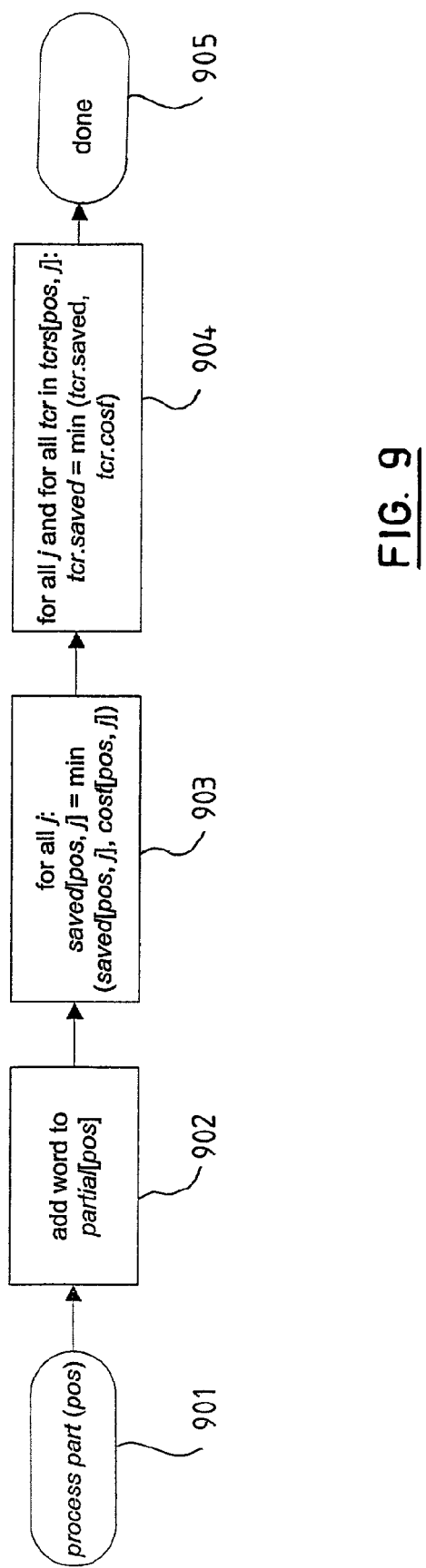
FIG. 9 is a flow diagram of a method of saving cost minima in accordance with an aspect of the present invention.

Referring to FIG. 9, the sub-routine applied when a partial match is found, to reflect the accumulated weights the saved cost and TCR cost minima is described as used at boxes 619 and 622 of FIG. 6.

Process partial match for a position is defined 901, process part(pos). The word is added to the list partial[pos] 902.

The saved cost matrix is set as the minimum of the saved cost and the cost for the position and displacement 903, for all j: saved[pos, j]=min(saved[pos, j], cost[pos, j]).

The TCR elements' saved cost is set as the minimum of the saved cost and the cost 904, for all j and for all tcr in tcrs[pos, j]: tcr.saved=min(tcr.saved, tcr.cost). The sub-routine then ends 905.

Worked EXAMPLE 1

Figure 10:
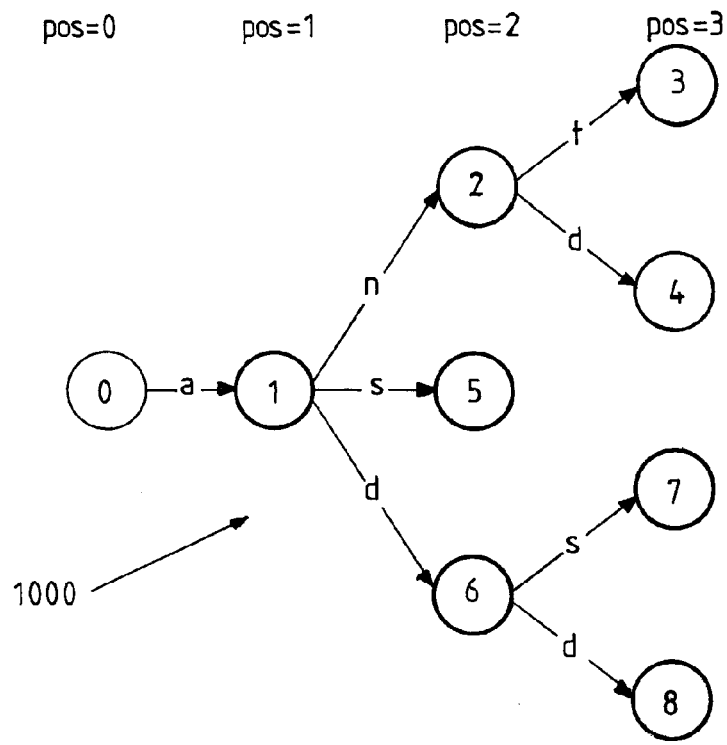
FIGS. 10A and 10B are example tries used in worked examples of aspects in accordance with the present invention.
Figure 10:
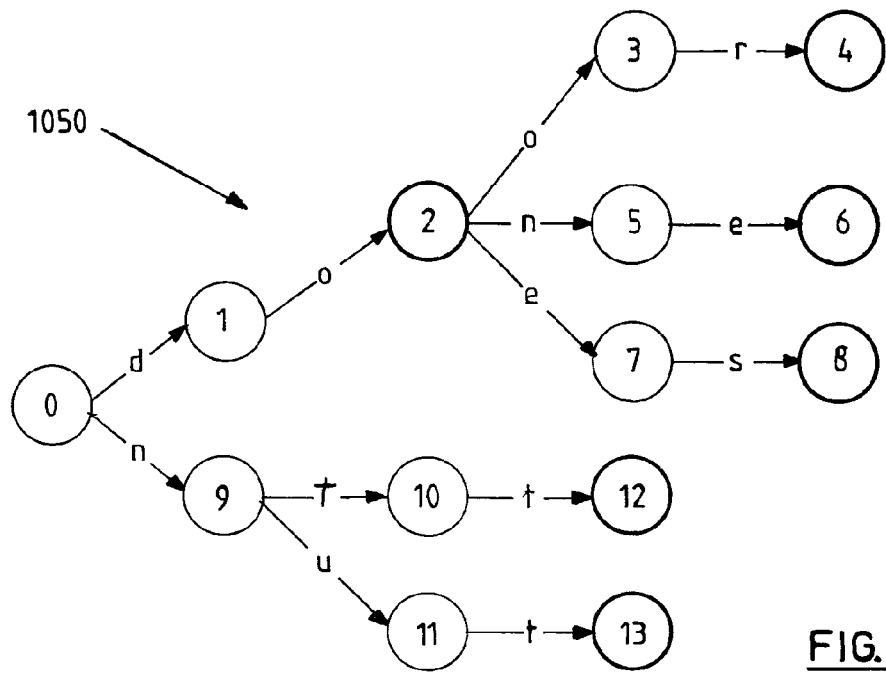

Referring to FIG. 10A, a worked example is provided to illustrate the described method further. The worked example follows the steps through the trie structure 1000 shown in FIG. 10A. This example shows the working of the TCR stack mechanism. Decompounding of words is not shown in this example.

Input pattern "adn"
Input parameters:
cost_del=35
cost_ins=30
cost_sub=45
cost_tra=25
step_cost=1000
max_ins=max_del=1
TC rules:
1: a->u (10)
2: d->s (20)
3: d->dd (10)
4: do->n (10)
Additionally (transposition rules):
5: ad->da (25)
6: dn->nd (25)

After matching rules with the input pattern, TCR data looks as follows. Only the relevant fields are shown. For example, the cost field is initially left undefined and therefore not shown, and the saved cost minima field applies to decompounding which is not shown in this example. Each TCR element is indexed by [pos, j, count]:

[1, 0,0]: char d init 2025 disp 0
[1, 0,1]: char u init 1010 disp 0
[1, 0,2]: char d init 2010 disp 1
[1, 1,0]: char n init 2025 disp 1
[1, 1,1]: char s init 1020 disp 1
[2,-1,0]: char d init 2025 disp -1
[2,-1,1]: char u init 1010 disp -1
[2,-1,2]: char d init 2010 disp 0
[2, 0,0]: char a prev [1, 0,0]
[2, 0,1]: char n init 2025 disp 0
[2, 0,2]: char s init 1020 disp 0
[2, 0,3]: char d prev [1, 0,2]
[2, 1,0]: char d prev [1, 1,0]
[2, 1,1]: char n init 1010 disp 0
[3,-1,0]: char a prev [2,-1,0]
[3,-1,1]: char n init 2025 disp -1
[3,-1,2]: char s init 1020 disp -1
[3,-1,3]: char dprev [2,-1,2]
[3, 0,0]: char d prev [2, 0,1]
[3, 0,1]: char n init 1010 disp -1
[4,-1,0]: char dprev [3,-1,1]

EXAMPLE 1A max_cost=50

After processing at each step, only the cost field of the TCR elements is shown as this is the only field that changes.

Step 0. Before starting, the costs are initialized as, cost for position 0,
displacement -1, 0, or 1:
Cost[0]: -1:∞ 0:0 1:35
Step 1. Processing the first character 'a' to go to State 1.
Pos 1, gathered string: a
Cost[1]: -1:30 0:0 1:35
TCR rules:
[1,0]: [0:∞] [1:∞] [2:∞]
[1,1]: [0:∞] [1:∞]
-1:30 is the result of insertion, the actual value is computed as Cost[0, 0]+cost_ins.

0:0 is the result of a match of the character 'a' in the pattern with 'a' in the trie transition, computed as Cost[0, 0]+0.
1:35 is the result of deletion, computed as Cost[1, 0]+cost_del.
None of the TCR stack elements in this position match the character 'a', thus all TCR element costs are set to -.
Step 2. Processing second character 'n' to go to State 2.
Pos 2, gathered string: an
Cost[2]: -1:30 0:45*1:10
TCR rules:
[2,-1]: [0:∞] [1:∞] [2:∞]
[2,0]: [0:∞] [1:1025] [2:∞] [3:∞]
[2,1]: [0:∞] [1:10]
-1:30 again comes as the result of an insertion applied from Cost[1, 0].
0:45 results from substitution (since 'n' does not match the 'd' in the pattern) applied to Cost[1, 0].
Rules [2,0,1] and [2,1,1] match the target character. The former results in cost 1025, computed as Cost[1,0]+2025-step_cost. The 0 in Cost[1,0] comes from the disp field of the TCR element, 2025 from the init field. The latter results in cost 10 (Cost[1,0]+1010-step_cost). The former is taken into account to form Cost[2,0], but since it is too big it does not influence the result. The latter is applied in Cost[2,1] which results in the value 10 for that accumulated cost.
The '*' before 1:10 denotes that at this point pos+1 matches the pattern length, i.e. this is a point where a match has been found and the accumulated cost can be used as the final cost for this match. 'an(10)' is added to the list of results.
Step 3. Processing third character T to go to State 3.
Pos 3, gathered string: ant
Cost[3]: -1:75*0:40 1:55
TCR rules:
[3,-1]: [0:∞] [1:∞] [2:∞] [3:∞]
[3,0]: [0:∞] [1:∞]
'ant(40)' is added to the list of results. The value comes from Cost[2,1]+cost_ins.
Step 4. Backtracking to State 2. There is nothing to modify, the values for Cost and TCRs are already computed at Step 2.
Step 5. Processing third character 'd.' to go to State 4.
Pos 3, gathered string: and
Cost[3]: -1:30*0:25 1:55
TCR rules:
[3,-1]: [0:∞] [1:∞] [2:∞] [3:∞]
[3,0]: [0:25] [1:∞]
The new costs and TCR element values overwrite the ones computed at Step 3 (which are no longer needed). Rule [3,0,0] is a character match, the value 25 is computed as 1025-step_cost, where 1025 is the cost of the previous element for this TCR element, i.e. [2,0,1] whose value was computed at Step 2. The cost 25 is applied in computing Cost[3,0]. The word 'and(25)' is added to the list of suggestions.
This is what the full state of the suggestions search looks like after this step:
Pos 3, gathered string: and
Cost[0]: -1:∞ 0:0 1:35
Cost[1]: -1:30 0:0 1:35
Cost[2]: -1:30 0:45*1:10
Cost[3]: -1:30*0:25 1:55
TCR rules:
[1,0]: [0:∞] [1:∞] [2:∞]
[1,1]: [0:∞] [1:∞]
[2,-1]: [0:∞] [1:∞] [2:∞]
[2,0]: [0:∞] [1:1025] [2:∞] [3:∞]
[2,1]: [0:∞] [1:10]
[3,-1]: [0:∞] [1:∞] [2:∞] [3:∞]
[3,0]: [0:25] [1:∞]

Step 6. Backtracking to State 2. No modifications to the state, but everything computed for pos 3 is no longer relevant. I.e. the full state is now:
  Pos 2, gathered string: an
  Cost[0]: −1:∞0:0 1:35
  Cost[1]: −1:30 0:0 1:35
  Cost[2]: −1:30 0:45*1:10
  TCR rules:
  [1,0]: [0:∞] [1:∞] [2:∞]
  [1,1]: [0:∞] [1:∞]
  [2,−1]: [0:∞] [1:∞] [2:∞]
  [2,0]: [0:∞] [1:1025] [2:∞] [3:∞]
  [2,1]: [0:∞] [1:10]
Step 7. Backtracking to State 1. No modifications to the state, but everything computed for pos 3 is no longer relevant. I.e. the full state is now:
  Pos 1, gathered string: a
  Cost[0]: −1:∞0:0 1:35
  Cost[1]: −1:30 0:0 1:35
  TCR rules:
  [1,0]: [0:∞] [1:∞] [2:∞]
  [1,1]: [0:∞] [1:∞]
Step 8. Processing second character 's' to go to State 5.
  Pos 2, gathered string: as
  Cost[2]: −1:30 0:20*1:55
  TCR rules:
  [2,−1]: [0:∞] [1:∞] [2:∞]
  [2,0]: [0:∞] [1:∞] [2:20] [3:∞]
  [2,1]: [0:∞] [1:∞]
Rule element [2,0,2] leads to the value 20 for Cost[2,0], which is also used to compute Cost[2,1], the final result for the suggestion 'as(55)'. However, since the accumulated cost for that suggestion is bigger than max_cost, the word is not added to the suggestions list.
Step 9. Backtracking to state 1.
Step 10. Processing second character 'd.' to go to State 6.
  Pos 2, gathered string: ad
  Cost[2]: −1:30 0:0*1:35
  TCR rules:
  [2,−1]: [0:1055] [1:∞] [2:1010]
  [2,0]: [0:∞] [1:∞] [2:∞] [3:∞]
  [2,1]: [0:∞] [1:∞]
'ad(35)' is a suggestion; there are two potential TCR matches for the next step.
Step 11. Processing third character 's' to go to State 7.
Pos 3, gathered string: ads
  Cost[3]: −1:30*0:45 1:80
  TCR rules:
  [3,−1]: [0:∞] [1:∞] [2:50] [3:∞]
  [3,0]: [0:∞] [1:∞]
Both potential TCR matches failed, 'ads(45)' is the result of substitution.
Step 12. Backtracking to State 6.
Step 13. Processing second character 'd.' to go to State 8.
  Pos 3, gathered string: add
  Cost[3]: −1:10*0:45 1:80
  TCR rules:
  [3,−1]: [0:∞] [1:∞] [2:∞] [3:10]
  [3,0]: [0:∞] [1:∞]
One of the matches that was potential at Step 10 pays off here. 0:45 is the result of either a substitution of 'n' with 'd', or TCR rule d->dd and a deletion.
Step 14. Backtracking to State 6.
Step 15. Backtracking to State 1.
Step 16. Backtracking to State 0.
Done Suggestions:
an
and
ad
ant
ads
add

EXAMPLE 1B max_cost=30

In Example 1B, since max_cost is not bigger than the smaller of cost_sub and cost_ins, even accumulated cost 0 is not below the restriction threshold, which means that only steps in the trie that have potential will be investigated.

After Step 1, the characters are gathered that match the characters in the pattern at positions pos+j where Cost[pos j] is smaller than max_cost. Here, this is only 'd'. The TCR elements for pos=2 are examined for ones that could yield a low enough cost. In this case they are:
  [2,−1,2]: char d init 2010 disp 0
  [2,0,1]: char n init 2025 disp 0
  [2,0,2]: char s init 1020 disp 0
  [2,1,1]: char n init 1010 disp 0

The rest are rejected because their Cost[1,disp] or prev.cost modulo step_cost are not smaller than our max_cost.

The final list of possible continuations cn is ['d', 'n', 's'].

After Step 2, a suggestion is output of 'an(10)' and again possible continuations are looked for. Only Cost[2 μl] is less than max_cost, but the pattern does not have a fourth character, so no matching character is added to the continuations list cn.

The TCR elements for pos=3 are:
  [3,−1,0]: char a prev [2,−1,0]
  [3,−1,1]: char n init 2025 disp −1
  [3,−1,2]: char s init 1020 disp −1
  [3,−1,3]: char d prev [2,−1,2]
  [3,0,0]: char d prev [2,0,1]
  [3,0,1]: char n init 1010 disp −1

Out of them only [3,0,0] could yield a low enough cost (since the cost of [2,0,1] is 1025, i.e. 25 after one step), thus only 'd' is added to cn.

Finally cn=['d'].

Since 't' is not in cn, we do not apply Steps 3 and 4.

After Step 5 we output 'and(25)'. The continuations list cn=[ ] because there are no more characters in the pattern and no rules lead to low cost.

After Step 8, Cost[2,0] is low enough to permit 'n' to be added to the list of constrained continuations. All TCR elements for pos=3 do not have a low cost potential.

The final cn is ['n'], but the trie does not provide a transition for 'n'.

After Step 10, Cost[2,0] is low enough, thus 'n' is added to cn. Out of the TCR elements for pos=3 only [3,−1,3] could lead to cost 10 after 1 more step with character 'd', thus 'd' is added to cn.

The final cn is ['n', 'd']. Steps 11 and 12 are skipped.

After Step 13, Cost[3, −1] is low, thus 'n' (character with zero-based index 3−1=2 in 'adn') is added to cn. This allows "addn" to be found if the trie had it.

Final suggestions list:
an
and

Worked EXAMPLE 2

Referring to FIG. 10B, a worked example is provided to illustrate the decompounding method further. The worked example follows the steps through the trie structure 1050 shown in FIG. 10B. The trie structure 1050 shows the words: do, door, done, does, n't (only as the end of compound word), and nut.

Input pattern: "doens' tdo"
Same costs as in worked example 1, with max_cost=40
TCR rules:
't->'t_(10) ('_' stands for space)
from transposition:
do->od (25) at pos 2
oe->eo (25) at pos 3
en->ne (25) at pos 4
ns->sn (25) at pos 5
s'->'s (25) at pos 6
't->t' (25) at pos 7
td->dt (25) at pos 8
do->od (25) at pos 9
TCR Stacks:
[1, 0,0]: char o init 2.25 disp 0
[1, 1,0]: char e init 2.25 disp 1
[2,-1,0]: char o init 2.25 disp -1
[2, 0,0]: char d prev [1, 0,0]
[2, 0,1]: char e init 2.25 disp 0
[2, 1,0]: char o prev [1, 1,0]
[2, 1,1]: char n init 2.25 disp 1
[3,-1,0]: char d prev [2,-1,0]
[3,-1,1]: char e init 2.25 disp -1
[3, 0,0]: char o prev [2, 0,1]
[3, 0,1]: char n init 2.25 disp 0
[3, 1,0]: char e prev [2, 1,1]
[3, 1,1]: char s init 2.25 disp 1
[4,-1,0]: char o prev [3,-1,1]
[4,-1,1]: char n init 2.25 disp -1
[4, 0,0]: char e prev [3, 0,1]
[4, 0,1]: char s init 2.25 disp 0
[4, 1,0]: char n prev [3, 1,1]
[4, 1,1]: char'init 2.25 disp 1
[5,-1,0]: char e prev [4,-1,1]
[5,-1,1]: char s init 2.25 disp -1
[5, 0,0]: char n prev [4, 0,1]
[5, 0,1]: char'init 2.25 disp 0
[5, 0,2]: char'init 3.10 disp 1
[5, 1,0]: char s prev [4, 1,1]
[5, 1,1]: char t init 2.25 disp 1
[6,-1,0]: char n prev [5,-1,1]
[6,-1,1]: char'init 2.25 disp -1
[6,-1,2]: char'init 3.10 disp 0
[6, 0,0]: char s prey [5, 0,1]
[6, 0,1]: char t init 2.25 disp 0
[6, 0,2]: char t prey [5, 0,2]
[6, 1,0]: char'prev [5, 1,1]
[6, 1,1]: char d init 2.25 disp 1
[7,-1,0]: char s prev [6,-1,1]
[7,-1,1]: char t init 2.25 disp -1
[7,-1,2]: char t prev [6,-1,2]
[7, 0,0]: char'prev [6, 0,1]
[7, 0,1]: char prev [6, 0,2]
[7, 0,2]: char d init 2.25 disp 0
[7, 1,0]: chartprev [6, 1,1]
[7, 1,1]: char o init 2.25 disp 1
[8,-1,0]: char'prev [7,-1,1]
[8,-1,1]: char prev [7,-1,2]
[8,-1,2]: char d init 2.25 disp -1
[8, 0,0]: chartprev [7, 0,2]
[8, 0,1]: char o init 2.25 disp 0
[8, 1,0]: char dprev [7, 1,1]
[9,-1,0]: char t prev [8,-1,2]
[9,-1,1]: char o init 2.25 disp -1
[9, 0,0]: char dprev [8, 0,1]
[10,-1,0]: char dprev [9,-1,1]
First pass.
Initialization:
Cost[0]: -1:∞0:0 1:35
Going to State 1.
Pos 1, gathered string: d
Cost[1]: -1:30 0:0 1:35
TCR rules:
[1,0]: [0:∞]
[1,1]: [0:∞]
No TCR matches, and no constraints since 0 is still below the threshold max_cost-min(cost_sub, cost_ins)=10.
Going to State 2.
Pos 2, gathered string: do
Cost[2]: -1:30 0:0 1:35
TCR rules:
[2,-1]: [0:1.55]
[2,0]: [0:∞] [1:∞]
[2,1]: [0:∞] [1:∞]
Here there is a valid word part with low enough potential cost, thus the word part is saved in partial[2] and the saved minima are updated, which for Position 2 are now:
Saved cost[2]: -1:30 0:0 1:35
Saved TCR rule cost:
[2,-1]: [0:1.55]
[2,0]: [0:∞] [1:∞]
[2,1]: [0:∞] [1:∞]
A space also needs to be processed which gives:
Pos 3, gathered string: do_
Cost[3]: -1:30 0:65 1:70
TCR rules:
[3,-1]: [0:∞] [1:∞]
[3,0]: [0:∞] [1:∞]
[3,1]: [0:∞] [1:∞]
One of the costs is below max_cost, thus this is added to the word parts list partial[3] and the following updates are made to the saved costs:
Saved cost[3]: -1:30 0:65 1:70
Saved TCR rule cost:
[3,-1]: [0:∞] [1:∞]
[3,0]: [0:∞] [1:∞]
[3,1]: [0:∞] [1:∞]
Go back to State 2 and process the letter 'o' to State 3:
Pos 3, gathered string: doo
Cost[3]: -1:30 0:45 1:70
TCR rules:
[3,-1]: [0:∞] [1:∞]
[3,0]: [0:∞] [1:∞]
[3,1]: [0:∞] [1:∞]
The only usable continuation from here is with the letter 'e', which the trie does not provide, so go back to State 2 and process 'n' to go to State 5:
Pos 3, gathered string: don
Cost[3]: -1:30 0:45 1:35
TCR rules:
[3,-1]: [0:∞] [1:∞]
[3,0]: [0:c] [1:1.25]
[3,1]: [0:∞] [1:∞]
From here, the process can only continue with 'e' (due to TCR[3,0,1]) and 's' [due to matching next letter after Cost[3, 1]). Going to State 6.
Pos 4, gathered string: done
Cost[4]: -1:30 0:25 1:60

TCR rules:
[4,−1]: [0:∞] [1:∞]
[4,0]: [0:0.25] [1:∞]
[4,1]: [0:∞] [1:∞]
'done' is a word part match with low enough cost, thus we add it to the list partial[4] and update the saved minima for Position 4:
Saved cost[4]: −1:30 0:25 1:60
Saved TCR rule cost:
[4,−1]: [0:∞] [1:∞]
[4,0]: [0:0.25] [1:∞]
[4,1]: [0:∞] [1:∞]
Process word separator which gives:
Pos 5, gathered string: done
Cost[5]: −1:55 0:90 1:70
TCR rules:
[5,−1]: [0:∞] [1:∞]
[5,0]: [0:∞] [1:∞] [2:∞]
[5,1]: [0:∞] [1:∞]
All of the costs here are higher than max_cost, including the potential TCR costs, thus do not update word parts list and saved costs.
Go back to State 6, State 5, State 2 and process 'e' to go to State 7.
Pos 3, gathered string: doe
Cost[3]: −1:30 0:0 1:35
TCR rules:
[3,−1]: [0:∞] [1:1.55]
[3,0]: [0:∞] [1:∞]
[3,1]: [0:∞] [1:∞]
Continuing to State 8.
Pos 4, gathered string: does
Cost[4]: −1:30 0:45 1:35
TCR rules:
[4,−1]: [0:∞] [1:∞]
[4,0]: [0:∞] [1:1.25]
[4,1]: [0:∞] [1:∞]
Here there is a word part with low enough potential cost (Cost[4,−1] and TCR[4,0,1] are both potentially smaller than max_cost). It is added to the list partial[4] and the saved minima are updated to:
Saved cost[4]: −1:30 0:25 1:35
Saved TCR rule cost:
[4,−1]: [0:∞] [1:∞]
[4,0]: [0:0.25] [1:1.25]
[4,1]: [0:∞] [1:∞]
(some of these come from "done" and some from "does").
Process space and again do not get a suitable candidate:
Pos 5, gathered string: does_
Cost[5]: −1:75 0:65 1:70
TCR rules:
[5,−1]: [0:∞] [1:∞]
[5,0]: [0:∞] [1:∞] [2:∞]
[5,1]: [0:∞] [1:∞]
Go back to State 8, State 7, State 2, State 0, and process 'n' to State 9.
Pos 1, gathered string: n
Cost[1]: −1:30 0:45 1:70
TCR rules:
[1,−1]:
[1,0]: [0:∞]
[1,1]: [0:∞]
It only makes sense to continue with 'd', but the trie does not provide that, so go back and finish the first pass.
The following words are in the parts lists:
partial[2]: 'do'
partial[3]: 'do'
partial[4]: 'done', 'does'

The saved minima data looks like this:
Saved cost[2]: −1:30 0:0 1:35
Saved cost[3]: −1:30 0:65 1:70
Saved cost[4]: −1:30 0:25 1:35
Saved TCR rule cost:
[2,−1]: [0:1.55]
[2,0]: [0:∞] [1:∞]
[2,1]: [0:∞] [1:∞]
[3,−1]: [0:∞] [1:∞]
[3,0]: [0:∞] [1:∞]
[3,1]: [0:∞] [1:∞]
[4,−1]: [0:∞] [1:∞]
[4,0]: [0:0.25] [1:1.25]
[4,1]: [0:∞] [1:∞]
The following passes will add to this information.
The process now needs to search again starting from the lowest position where a partial match has been found, in this case 2.
Pass 2 starts at Position 2, State 0 with the following costs:
Cost[2]: −1:30 0:0 1:35
TCR rules:
[2,−1]: [0:1.55]
[2,0]: [0:∞] [1:∞]
[2,1]: [0:∞] [1:∞]
Process 'd' to go to State 1:
Pos 3, gathered string: d
Cost[3]: −1:30 0:45 1:70
TCR rules:
[3,−1]: [0:0.55] [1:∞]
[3,0]: [0:∞] [1:∞]
[3,1]: [0:∞] [1:∞]
Only 'e' makes a useful continuation from here, but the trie does not have it. Going back to State 0, and processing 'n' to State 9.
Pos 3, gathered string: n
Cost[3]: −1:30 0:45 1:35
TCR rules:
[3,−1]: [0:∞] [1:∞]
[3,0]: [0:∞] [1:1.25]
[3,1]: [0:∞] [1:∞]
Still no useable continuation, Pass 2 finishes with no results.
Pass 3 starts at Position 3, State 0 with the following costs:
Cost[3]: −1:30 0:65 1:70
TCR rules:
[3,−1]: [0:∞] [1:∞]
[3,0]: [0:∞] [1:∞]
[3,1]: [0:∞] [1:∞]
and it quickly finishes just like Pass 2:
Pos 4, gathered string: d
Cost[4]: −1:75 0:100 1:70
TCR rules:
[4,−1]: [0:∞] [1:∞]
[4,0]: [0:∞] [1:∞]
[4,1]: [0:∞] [1:∞]
Pos 4, gathered string: n
Cost: −1:75 0:65 1:70
TCR rules:
[4,−1]: [0:∞] [1:1.55]
[4,0]: [0:∞] [1:∞]
[4,1]: [0:∞] [1:∞]
Pass 4 starts at Position 4, State 0 with these costs:
Cost[4]: −1:30 0:25 1:35
TCR rules:
[4,−1]: [0:∞] [1:∞]
[4,0]: [0:0.25] [1:1.25]
[4,1]: [0:∞] [1:∞]

Processing 'd' to State 1 does not lead to anything useful:
Pos 5, gathered string: d
Cost[5]: −1:55 0:65 1:70
TCR rules:
[5,−1]: [0:∞] [1:∞]
[5,0]: [0:∞] [1:∞] [2:∞]
[5,1]: [0:∞] [1:∞]
But processing 'n' does (going to State 9)
Pos 5, gathered string: n
Cost[5]: −1:30 0:25 1:60
TCR rules:
[5,−1]: [0:∞] [1:∞]
[5,0]: [0:25] [1:∞] [2:∞]
[5,1]: [0:∞] [1:∞]

Here the saved TCR cost for TCR[4,0,1] pays off and leads to the cost 25 for Cost[5,0]. The only useful continuations are ' and s, thus 'u' can be skipped in the trie.

Pos 6, gathered string: n'
Cost[6]: −1:55 0:25 1:60
TCR rules:
[6,−1]: [0:∞] [1:1.55] [2:2.35]
[6,0]: [0:∞] [1:∞] [2:∞]
[6,1]: [0:∞] [1:∞]

The only useful continuation is 't' (both due to matching and TCR[6,−1,2]).

Pos 7, gathered string: n't
Cost[7]: −1:55 0:25 1:60
TCR rules:
[7,−1]: [0:∞] [1:1.80] [2:1.35]
[7,0]: [0:∞] [1:∞] [2:∞]
[7,1]: [0:∞] [1:∞]

This is a word part, it has low potential cost, but it is marked as useable only as the end of a compound word, thus 'n't' is not added to the words parts list and the saved costs for Position 7 are not updated.

Still, there is a word part if a space is added to it, which leads to

Pos 8, gathered string: n't
Cost[8]: −1:35 0:70*1:70
TCR rules:
[8,−1]: [0:∞] [1:0.35] [2:∞]
[8,0]: [0:∞] [1:∞]
[8,1]: [0:∞]

where the rule 't->'t (10) is applied. This is another useful word part, thus it is added to the list partial[8] and the saved costs for Position 8 are updated:

Saved cost[8]: −1:35 0:70*1:70
Saved TCR rule cost:
[8,−1]: [0:∞] [1:0.35] [2:∞]
[8,0]: [0:∞] [1:∞]
[8,1]: [0:∞]

After this Pass 4 quickly finishes.

Passes 5, 6 and 7 are skipped (because there are no partial matches of that length). There was not a match for Position 8 after the initial pass either, but the procedure also allows subsequent passes to add to the partial matches, which Pass 4 did.

Pass 8 starts at
Cost[8]: −1:35 0:70*1:70
TCR rules:
[8,−1]: [0:∞] [1:0.35] [2:∞]
[8,0]: [0:∞] [1:∞]
[8,1]: [0:∞]
Going to state 1:
Pos 9, gathered string: d
Cost[9]: −1:35*0:70 1:70
TCR rules:
[9,−1]: [0:∞] [1:∞]
[9,0]: [0:∞]
The only useful transition from here is 'o' (to State 2):
Pos 10, gathered string: do
Cost[10]: *−1:35 0:70 1:70
TCR rules:
[10,−1]: [0:∞]

Here there is a match of length 2 at position 10. To create the full match, all matches in partial[10-2] are enumerated, in this case only "n't_", which still does not lead to position 0, thus all matches in partial[10-2-4] are enumerated, "done" and "does". The two combinations are "donen't do" and "doesn't do". These are compared against the input pattern to evaluate their actual cost (which is at least as big as Cost[10,−1]), which causes "donen't do" to be rejected.

After this Pass 8 finishes. Pass 9 is skipped.

The procedure finishes, and the only suggestion is doesn't do.

Like some implementations of Ukkonen's algorithm, the look-ups performed in this method do not visit nodes in the dictionary trie repeatedly. Look-up in some branches of the trie is immediately restricted when the accumulated costs do not permit too much freedom.

Approximate word part look-up in the dictionary trie is done only once per pattern position using the saved best-case data of all matches. This is a significant improvement to previous implementations where approximate look-ups for right hand side parts were repeated for each left hand side match, and several levels of nested word part look-ups were possible.

Since the method treats a multitude of displacements uniformly, it is possible to use vector processing units efficiently to perform the operations on all displacements simultaneously. Due to the use of TCR stacks this vectorization is applicable to significant portions of all processing. Vector processing units such as AltiVecNMX (AltiVec is a trade mark of Freescale Semiconductor Inc.) may be used as well as the synergistic units of Cell Broadband Engine.

A vector unit can apply the same operation to a number of arguments at the same time. For example, a vector unit may do this for 8 arguments at a time. If displacements are permitted from −4 to 3, for all of them the method can apply e.g. "process transition 701" and "process TCR 710" simultaneously, giving 8 times speedup for this part of the processing, which often takes most of the processing time.

Referring to FIG. 11, a computer system 1100 is shown on which the present invention may be implemented. A computer system 1100 has a central processing unit 1101 with primary storage in the form of memory 1102 (RAM and ROM). The memory 1102 stores program information and data acted on or created by the programs. The program information includes the operating system code for the computer system 1100 and application code for applications running on the computer system 1100. Secondary storage includes optical disk storage 1103 and magnetic disk storage 1104. Data and program information can also be stored and accessed from the secondary storage.

The computer system 1100 includes a network connection means 1105 for interfacing the computer system 1100 to a network such as a local area network (LAN) or the Internet. The computer system 1100 may also have other external source communication means such as a fax modem or telephone connection.

The central processing unit 1101 includes inputs in the form of, as examples, a keyboard 1106, a mouse 1107, voice input 1108, and a scanner 1109 for inputting text, images, graphics or the like. Outputs from the central processing unit 1100 may include a display means 1110, a printer 1111, sound output 1112, video output 1113, etc.

In a distributed system, a computer system 1100 as shown in FIG. 11 may be connected via a network connection 1105 to a server on which applications may be run remotely from the central processing unit 1101 which is then referred to as a client system.

Applications which may run on the computer systems from a storage means or via a network connection may include word processing programs, Internet access programs including search engines for searching the World Wide Web, other text indexing and retrieving programs for databases, machine translation programs for translating foreign language documents, optical character recognition programs for recognizing characters from scanned documents, etc.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications can be made to the foregoing without departing from the scope of the present invention.

The invention claimed is:

1. A method for approximate string matching of an input pattern to a trie data structure, comprising:
    associating a unique cost value with each of a plurality of correction rules;
    traversing, using a computer device, a trie data structure to find approximate partial and full character string matches of the input pattern, comprising, for each character traversed as a string of characters is gathered through the trie data structure:
        applying any applicable correction rules to the character;
        accumulating the unique cost associated with the any applicable correction rules to an accumulated cost; and
        in case that both the accumulated cost and potential costs of applicable correction rules for a gathered string exceed a predetermined threshold, restricting the traverse through the trie data structure; and
    selecting a match based on the accumulated cost of resulting strings.

2. A method as claimed in claim 1, wherein recursive processing of branches of the trie is:
    fully performed if accumulated costs of a character string are below a predefined threshold;
    performed with restriction to characters that match characters at active positions in the input pattern, or are in applicable outstanding correction rules; or
    not performed if such characters are not present.

3. A method as claimed in claim 1, wherein in addition to correction rules the method applies elementary transitions of characters including one of an insertion, a deletion, or a replacement, each associated with a cost.

4. A method as claimed in claims 1, wherein correction rules are generated automatically for all possible applications of character transposition in the input pattern.

5. A method as claimed in claim 1, further comprising including determining correction rules that are applicable to characters in an input pattern, before starting the traverse.

6. A method as claimed in claim 1, further comprising determining candidate approximate matches and using the accumulated cost as a weighting for the candidate matches.

7. A method as claimed in claim 1, including determining approximate partial matches where a length of the partial match is less than a length of the input pattern, and saving the partial matches with the accumulated cost as a starting cost for a traverse for right hand matches to the input pattern.

8. A method as claimed in claim 7, wherein traverses for right hand matches of compound words are started at the character position of an end position of the partial match.

9. A method as claimed in claim 7 further comprising iterating through all positions for which there is a partial match and using saved accumulated costs as starting points for right hand side match traverses.

10. A method as claimed in claim 9, wherein any full right hand side matches are combined with all left hand side partial matches.

11. A method as claimed in claim 10, wherein left hand side partial matches are combined.

12. A method as claimed in claim 7, wherein accumulated costs for one or more partial matches are used to compile a best case scenario for the right hand side look-up.

13. A method as claimed in claim 1, wherein correction rules are applied across points of attachments of word parts.

14. A method as claimed in claim 1, wherein vector processing is used to perform the corrections simultaneously for a range of displacements.

15. A system for approximate string matching of an input pattern to a trie data structure, comprising at least one computer device, comprising:
    a trie data structure having nodes representing characters in a string, the trie data structure storing allowed character strings; and
    a plurality of character correction rules to be applied to the input pattern including a transition of one or more characters in the input pattern, each of the plurality of character correction rules having a unique cost associated therewith;
    wherein the computer device traverses the trie data structure including, for each character traversed as a string of characters is gathered through the trie data structure:
        applying any applicable correction rules to the character;
        accumulating the unique cost associated with the any applicable correction rules to an accumulated cost; and
        in case that both the accumulated cost and potential costs of applicable correction rules for a gathered string exceed a predetermined threshold, restricting the traverse through the trie data structure.

16. A system as claimed in claim 15, the computer device further storing accumulating costs for a gathered character string that is gathered through the trie data structure.

17. A system as claimed in claim 15, the computer device further setting a maximum cost to restrict the traverse of the trie data structure.

18. A system as claimed in claims 15, the computer device further storing partial string matches with a saved accumulated cost.

19. A system as claimed in claim 15, the computer device further performing correction on a range of displacements simultaneously.

20. A system as claimed in claim 15, wherein allowed character strings are words and word parts, or recognised data components and partial data components.

21. A computer program product stored on a computer readable storage device, comprising computer readable storage device for performing the steps of:

associating a unique cost value with each of a plurality of correction rules;

traversing, using a computer device, a trie data structure to find approximate partial and full character string matches of the input pattern, comprising, for each character traversed as a string of characters is gathered through the trie data structure:
  applying any applicable correction rules to the character;
  accumulating the unique cost associated with the any applicable correction rules to an accumulated cost; and
  in case that both the accumulated cost and potential costs of applicable correction rules for a gathered string exceed a predetermined threshold, restricting the traverse through the trie data structure; and selecting a match based on the accumulated cost of resulting strings.

* * * * *